(12) United States Patent
Brackmann et al.

(10) Patent No.: US 7,482,928 B2
(45) Date of Patent: *Jan. 27, 2009

(54) MINI PALLET-BOX MOVING CONTAINER

(75) Inventors: Rogers F. Brackmann, St. Charles, IL (US); Jay R. Brackmann, Wheaton, IL (US); Dennis J. Kossnar, Batavia, IL (US); David Ash, Bartlett, IL (US); Jacques M. Dulin, Sequim, WA (US)

(73) Assignee: Private Pallet Security Systems, LLC, Warrenville, IL (US)

( * ) Notice: Subject to any disclaimer, the term of this patent is extended or adjusted under 35 U.S.C. 154(b) by 169 days.

This patent is subject to a terminal disclaimer.

(21) Appl. No.: 11/375,504

(22) Filed: Mar. 13, 2006

(65) Prior Publication Data

US 2008/0297346 A1    Dec. 4, 2008

Related U.S. Application Data

(60) Continuation-in-part of application No. 10/330,149, filed on Dec. 27, 2002, now Pat. No. 7,011,214, application No. 11/375,504, which is a division of application No. 10/940,447, filed on Sep. 14, 2004, now Pat. No. 7,059,819, and a continuation-in-part of application No. 11/128,879, filed on May 13, 2005.

(60) Provisional application No. 60/374,871, filed on Apr. 22, 2002, provisional application No. 60/344,010, filed on Dec. 28, 2001.

(51) Int. Cl.
*G08B 13/14* (2006.01)
*G08B 23/00* (2006.01)
*B60Q 1/00* (2006.01)

(52) U.S. Cl. ............ 340/572.1; 340/425.5; 340/539.13; 340/585; 180/290

(58) Field of Classification Search ............... 340/572.1
See application file for complete search history.

(56) References Cited

U.S. PATENT DOCUMENTS

| 2,269,622 A | 1/1942 | Downing |
| 2,607,518 A | 8/1952 | Cohen |

(Continued)

FOREIGN PATENT DOCUMENTS

| KR | 10-20060032549 | 4/2006 |
| KR | 10-20060070289 | 6/2006 |
| KR | 10-20060099992 | 9/2006 |
| WO | WO/03057533 | 7/2003 |

OTHER PUBLICATIONS

SAVR Communications—SmartContainer for Pharmaceuticals and High Value Biological Medications.

(Continued)

*Primary Examiner*—Donnie L Crosland
(74) *Attorney, Agent, or Firm*—James P. Muraff; Neal, Gerber & Eisenberg LLP

(57) ABSTRACT

Smart, rollable, mini-pallet cargo container system comprising robust, auditable, secure, sealable, lockable, trackable and pollable, universal, half/quarter-sized boxes particularly useful for moving highly valuable or sensitive, personal, political, military or commercial materials, embodiments include truly verifiable ballot boxes, verifiably secure moving containers. Blast attenuation inserts are disclosed. The boxes include electronic locks containing event memory, sensors and alarms, and RF communications and GPS locator module(s) that radio to a base station the time, location and status of the inventive box, and anomalous events as they occur, including unauthorized attempts to open or break into the container, or potential damage events. In addition, both the locks and comm modules are programmable, and provide extensive, and selectably pollable and down-loadable, printable event, access and transport history and audit trails. The comm system permits remote tracking and real time status check via the Internet, LAN or WAN wireless networks.

20 Claims, 19 Drawing Sheets

U.S. PATENT DOCUMENTS

| | | | |
|---|---|---|---|
| 3,240,408 A | 3/1966 | Lapansie | |
| 4,102,540 A | 7/1978 | Fox et al. | |
| 4,415,298 A | 11/1983 | Voigt | |
| 4,566,296 A | 1/1986 | Kochakis | |
| 4,566,588 A | 1/1986 | Kataczynski | |
| 4,746,034 A | 5/1988 | Ata et al. | |
| 4,750,197 A * | 6/1988 | Denekamp et al. | 455/404.2 |
| 4,878,605 A | 11/1989 | Doyle et al. | |
| 5,125,710 A | 6/1992 | Gianelo | |
| 5,269,414 A | 12/1993 | D'Hollander | |
| 5,281,499 A | 1/1994 | Bussard | |
| 5,310,303 A | 5/1994 | Betts | |
| 5,319,362 A | 6/1994 | Hyatt, Jr. | |
| 5,345,370 A | 9/1994 | Murray et al. | |
| 5,359,505 A | 10/1994 | Story et al. | |
| 5,398,190 A * | 3/1995 | Wortham | 455/456.3 |
| 5,452,811 A | 9/1995 | Taravella et al. | |
| 5,565,858 A * | 10/1996 | Guthrie | 340/10.33 |
| 5,645,184 A | 7/1997 | Rowse et al. | |
| 5,656,993 A | 8/1997 | Coulthard | |
| 5,686,888 A * | 11/1997 | Welles et al. | 340/539.13 |
| 5,719,771 A * | 2/1998 | Buck et al. | 455/456.5 |
| 5,743,701 A | 4/1998 | Green | |
| 5,745,044 A | 4/1998 | Hyatt, Jr. et al. | |
| 5,774,053 A | 6/1998 | Porter | |
| 5,775,148 A | 7/1998 | Layton et al. | |
| 5,892,441 A * | 4/1999 | Woolley et al. | 340/539.26 |
| 5,900,610 A | 5/1999 | Kelly, Jr. | |
| 5,917,433 A * | 6/1999 | Keillor et al. | 340/989 |
| 5,960,708 A | 10/1999 | DeTemple et al. | |
| 6,005,487 A | 12/1999 | Hyatt, Jr. et al. | |
| 6,006,918 A | 12/1999 | Hart | |
| 6,082,153 A | 7/2000 | Schoell et al. | |
| 6,142,327 A | 11/2000 | Riggio et al. | |
| 6,416,271 B1 | 7/2002 | Pigott et al. | |
| 6,422,409 B2 | 7/2002 | Kofod | |
| 6,426,699 B1 | 7/2002 | Porter | |
| 6,531,216 B1 | 3/2003 | Williams et al. | |
| 6,661,339 B2 | 12/2003 | Muirhead | |
| 6,718,888 B2 | 4/2004 | Muirhead | |
| 6,787,503 B2 | 9/2004 | Suh | |
| 6,811,895 B2 | 11/2004 | Murasko et al. | |
| 6,901,304 B2 | 5/2005 | Swan et al. | |
| 6,939,827 B2 | 9/2005 | Shariat | |
| 6,943,678 B2 | 9/2005 | Muirhead | |
| 7,002,472 B2 | 2/2006 | Stratmoen et al. | |
| 7,011,214 B2 | 3/2006 | Brackmann et al. | |
| 7,220,705 B2 | 5/2007 | Hare | |
| 7,233,247 B1 | 6/2007 | Crossno et al. | |
| 2003/0123965 A1 | 7/2003 | Brackmann et al. | |
| 2003/0125821 A1 | 7/2003 | Trotter et al. | |
| 2004/0041706 A1 | 3/2004 | Stratmoen et al. | |
| 2004/0044493 A1 | 3/2004 | Coulthard | |
| 2004/0168618 A1 | 9/2004 | Muirhead | |
| 2004/0227630 A1 | 11/2004 | Shannon et al. | |
| 2005/0011800 A1 | 1/2005 | Messinger | |
| 2005/0036847 A1 | 2/2005 | Brackmann et al. | |
| 2005/0153113 A1 | 7/2005 | Hseih et al. | |
| 2005/0237184 A1 | 10/2005 | Muirhead | |
| 2005/0241548 A1 | 11/2005 | Muirhead | |
| 2005/0284314 A1 | 12/2005 | Coulter et al. | |
| 2006/0071786 A1 | 4/2006 | Fano | |
| 2006/0145814 A1 | 7/2006 | Sun et al. | |
| 2007/0281155 A1 | 12/2007 | Tao et al. | |

OTHER PUBLICATIONS

PCT International Search Report dated Apr. 24, 2003 for PCT/US02/041542.

PCT International Search Report dated Oct. 4, 2007 for PCT/US2006/09144.

PCT International Search Report and Written Opinion dated May 26, 2008 for PCT/US07/085032.

* cited by examiner

MINI PALLET-BOX MOVING CONTAINER

CROSS-REFERENCE TO RELATED APPLICATIONS

This application is a CIP of Ser. No. 10/330,149, filed Dec. 27, 2002, U.S. Pat. No. 7,011,214, which claims benefit of 60/374,871, filed Apr. 22, 2002, and claims benefit of 60/344, 010, filed Dec. 28, 2001. This application is a DIV of Ser. No. 10/940,447, filed Sep. 14, 2004, now U.S. Pat. No. 7,059,819, and is a CIP of Ser. No. 11/128,879, filed May 13, 2005. The disclosures of these applications are hereby incorporated by reference.

FIELD OF THE INVENTION

The invention is directed to the field of cargo transportation and more particularly to a smart cargo container system comprising secure (strong and lockable), sealable, stackable, auditable, pollable, and trackable, universal, "mini-pallet boxes," used to replace cardboard or plastic packing boxes and sized to fit through residential and office doorways. Sophisticated electronic locks, sensors and alarms are provided, as well as one or more RF communications and GPS locator module(s) that "radios" to a base station the time, location and status of the inventive smart cargo container, and any anomalous events as they occur, including unauthorized attempts to open or break into the container, or potential damage events such as fire, exposure to high temperature, radiation, biological contaminants, unauthorized movement, shock and the like. In addition, both the locks and comm modules are programmable, and provide extensive, and selectably pollable and downloadable event, access and transport history and audit trails. The comm system permits remote tracking and real time status check via the Internet, LAN or WAN wireless networks.

BACKGROUND OF THE ART

A variety of cargo container systems have been proposed in the prior art but have not developed into a universal system for cargo transport that answers the complex needs of both those moving their business or residence and the trucking industry.

Contracting a moving company to pack and ship all of their worldly goods is an act of extreme trust on the part of the customer, and high liability for the mover. Indeed, in many cases, the moving company refuses to pack all or some of the goods, and routinely declines to ship expensive or fragile goods, leaving such goods to specialty packing and transportation firms. Thus, a home owner, renter or company, upon undertaking to move, may find that the moving company does not want to handle expensive objects of art, antiques, collectables, memorablilia, electronics or other fragile or valuable objects, in large part due to the potential for theft in transit, including intermediate warehousing or transfer stations.

Thus, companies shipping retail items typically budget 24% of the value of a shipment for loss due to theft in transit, while moving companies may budget 10% or more. A typical type of petty theft occurs from a stacked pallet of merchandise in corrugated containers. In the case of a moving van, since boxes may be labeled with content information, the theft may selectively target the most valuable items. A thief will open, cut or punch a hole in an exposed side of a box, remove some merchandise and then rotate the box to conceal the damaged side. Typical loading dock or at destination location (of the person or company moving) check-in procedures merely confirm the receipt of a number of pallets containing a number of cartons or the total number of boxes in the moving manifest. Since the time and location of the loss cannot be determined at the time of discovery by simple external inspection, no recovery attempt is made. Such theft losses also occur in the warehouses and back rooms of retailers and wholesalers, and in the moving storage and transfer facilities.

Another common and accepted form of loss is in-transit damage. When items are shipped in corrugated boxes in a moving load or on commercial pallets, it is common for the boxes to sustain some internal or corner and end damage that damages the contents, or in the case of retail products renders them unsuitable for full value retail sale. Many wholesalers and distributors offer a level of claim for damages of 1 to 2% that will be honored without requiring return of goods. These low-level claims are frequently taken as an automatic discount by retailers regardless of the condition of the goods they receive.

Additionally, much larger losses due to damage during shipment are not uncommon, often due to poor packing of goods, but primarily due to movement damage, that is, damage due to handling of cartons from the initial home, apartment or office location into the moving van, jostling of boxes in the van during transport, handling of the boxes during unloading or transfer into and out of intermediate storage or transfer warehousing including during combining partial loads into a full load for long distance transfer, and accidental damage at any of those steps. Typically, such damages comprise large damage claims, as all claims, except self-packing claims come back to the moving company for resolution and restitution. Management of such large damage claims, which require inspection and repair of the goods, or in cases of retail goods shipping requires return of goods as proof of damage, are very costly. They entail additional shipping costs and substantial administrative overhead, as well as genuine costs due to product loss.

Accordingly, this exemplary state of the art reveals that there remains a significant and substantial unmet need for universal, robust, fully closeable, lockable, auditable and trackable small pallet containers for secure shipment of a wide range of household, business and government goods and records.

THE INVENTION

The invention comprises a smart, mini-pallet-box cargo container system particularly adapted for residential, apartment and office moving which mini-pallet box includes features of being universal, robust, rollable on casters, secure (fully closeable and lockable), sealable, stackable, auditable, condition monitorable and trackable (via GPS). Optional features include blast mitigation inserts, and adaptation as secure, verifiable ballot boxes or for transport and storage of vital, archival, or sensitive government and diplomatic documents and items.

The inventive universal, "mini-pallet boxes", when configured for moving and storage, are packed (by the customer or mover) and locked by the mover in presence of the customer, or optionally by the customer him/herself, at the point of origination (in the home, apartment or office from which the move originates) and then are shipped and tracked by the mover to the destination location. There they are unlocked by the customer or other recipient having an authorized key, and unpacked by the customer, or mover in the presence of the customer or his/her authorized representative, having been certifiably maintained secured and tracked throughout the entire transport sequence. A print-out of both the box lock/ unlock audit trail and of the transportation track (route) may be provided as part of a certification of security service option, either for the moving company internal management control and review, or for the customer as part of a "comfort" and proof of handling verification service.

By way of example, the inventive universal smart cargo containers may be any convenient size for residential and office moving. Preferably the mini-pallet boxes are typically rectangular, having exemplary dimensions on the order of 40" long×22"-33" wide×33" high outside dimensions and 37¼"×19"-30"×25½" inside dimensions. These dimensions permit the mini-pallet boxes to fit through a standard home entry/exit doorway opening of 36" width. Since many interior doors range from 24-32" wide, a preferred width dimension of about 28" also permits the mini-pallet boxes to be wheeled directly into most rooms. Some rooms are accessible only through 24", 26", 28" or 30" wide openings, in which case, as needed, mini-pallet boxes having an external width dimension of less than 28" can easily be provided by adjustment of the container size. This preferred configuration is approximately a half standard pallet, so that two placed front face to back or front face of a second mini-pallet box fit in the footprint of a standard pallet. However, it should be understood that the inventive mini-pallet boxes may be square, or smaller rectangles, e.g., ¼ standard pallet sized.

An important feature of the inventive mini-pallet boxes is the provision of bottom mounted casters that permit the boxes to be loaded in the home, apartment or office, rolled out and up ramps directly into the moving van at the loading end, and permit the reverse movement at the destination end of the move.

It is an important feature of the system and method aspects of the invention that the inventive mini-pallet boxes are loaded and locked at the origination end directly in the home, apartment or office, and not unlocked until they are in place to be unloaded. Audit and tracking, optionally including condition status monitoring and/or location polling, that are verifiable by the customer(s) are key features of the inventive system and method. Optionally, an archival record can be printed for confirmation of the access and trip route integrity of the moving process. The customer gains an immense sense of security when he/she locks the container at point of origination, personally keeps custody of the authorization-to-open key for the duration of the move, and personally unlocks the container at the destination.

It should be understood that the inventive high security, lockable, auditable, pollable and trackable mini-pallet boxes may be reserved for only high value items in a given move, such as valuable objects, while ordinary moving boxes may be used in the usual way as well. That is, the loads may be mixed, regular cardboard boxes and the inventive mini-pallet boxes.

The mini-pallet boxes are robust. By way of example, they are constructed of any high strength material, and are preferably unitary. Preferred box/bin materials include: steel; aluminum; fiberglass; high strength homopolymers or copolymers; composites; laminated or reinforced polymers (such as carbon, Nomex, Kevlar, and/or glass fiber reinforced polymers); high-density co-molded polyolyfins; polyolefin and aluminum or steel honeycomb or corrugated (sinusoidal or angular in shape) laminates, such as poly-olefin skins/aluminum honeycomb/corrugated core laminates, multi-layer woven fiber or fabric and aluminum sheet sandwich laminates; or any other available suitable rugged material, available at the present or in the future. It is preferred that a mini-pallet box is capable of carrying substantial loads, and is capable of withstanding the weight of at least two additional fully-loaded mini-pallet boxes stacked on top of it. Optionally, a blast liner or blast cover may be provided.

In the preferred embodiment, as part of the robustness feature, the mini-pallet boxes include an exterior reinforcement structure of fabricated steel, titanium or other hardened metal alloy strips, termed an "exoskeleton", that functions to provide: 1) structural reinforcement of plastic walls, lid and floor; and 2) fortification of the box against unauthorized entry for security purposes. Metal "flat" or strapping crisscrosses the lid and preferably align with vertical straps, channels, or sheets along at least two opposed vertical sidewalls (preferably the front and back end walls) of the box. The vertical side wall straps, channels or sheets extend to wide strapping under the floor. A front side includes a lock mechanism with a pivoting, flanged lock cover. Other locks may be included as described in more detail below in connection with the ballot box embodiment, by way of example.

By way of orientation terminology, the side of the mini-pallet box that includes the primary locking mechanism is called the front, which is on one of the long, 40" sides in the preferred example. The back side is the opposite long side, and the hinges for the single-piece top lid are located along the back side margin of the lid at the juncture with the back side wall. The respective right and left side walls are the short sides of the inventive mini-pallet box, in the preferred example from 24'-33" in length, the length being selected depending on the access door width of a particular move site. Of course, the most universal size is the smallest, but that is less efficient, so for homes, apartments and office moves, a size in the range of 28"-33" is preferred, so that with the lock assembly on the front and the hinges on the back, plus the overhang of the lid, there is clearance through doorways. That is, when the inventive mini-pallet box is wheeled, the long axis of the box is oriented in the direction of travel, so that the front and back are now the "sides" facing the door frame as the box is wheeled through the doorway.

A single panel, hinged top lid is provided for the container, a set of hinges being located at the top of the rear wall. The lid in the open position rests in a generally vertical, but backwardly-canted position at the back of the container. As noted below, the preferred embodiment includes wheels to permit ease of completing the moving process. However, in embodiments without wheels, it is preferred to provide recesses in the bottoms of the four corner feet, and mating raised bosses on the top of the lid so that stacked mini-pallet boxes will resist sliding.

In the full-sized pallet box of our co-pending U.S. application Ser. No. 11/129,879, the lock mechanism and rear hinges are located on short sides of the box. In the inventive mini-pallet box, the lock mechanism and hardware and the lid hinges are located on opposed long sides of the box, that is, these assemblies have been rotated 90°. There is an unexpected advantage of this orientation. Since the front latches, the lock mechanism and the rear hinges are spaced along substantially the full length of their respective long sides of the box and the exoskeleton straps extend down the full vertical height of those sides, there is less of an opportunity to pry open the lid. That is, the longer the lid span, the more it can flex in the middle, leaving a pry point for theft attempts. However, in the instant mini-pallet box structure, since the lock and hinge mechanisms are on those sides, the most flexibly vulnerable sides of the box are fully protected, these mechanisms functioning as anti-pry-open assemblies.

The top is also armored with exoskeleton strapping extending the longitudinal length of the lid and transversely across it. In addition, the lid overhangs the top to protect from fluid entry, and the marginal vertical edge of the lip preferably includes a steel band for strength and security. The front of the lid includes a pair of slotted tangs that are engaged by cam-type locks on the front side wall adjacent the top. The underside of the lid includes a wide seal strip, such as a double seal of neoprene or other sealing material, adjacent and all around the margin that is aligned with the box side top edges. Thus, when the top is latched and locked, the seal strip is compressed providing a substantially hermetic seal between the box top and side walls of the box. The underside of the lid includes an engineered array of reinforcing recesses, optionally in which various sensors or granular blast attenuator materials can be disposed. The top corners of the lid optionally include either recessed or raised bosses that mate with the feet or casters of a box stacked on the top of it, to prevent the stacked box from sliding during transport.

Additional strapping extends under the box floor so that the steel flat under-box strapping in conjunction with the channels to which the strapping is secured acts as a sling or harness. The box strapping is provided in three panels, a front and a back that are hinged to a bottom panel at the front and back edges of the bottom panel. The front and back side wall straps can also optionally included hanger members (such as horizontal pins, inverted J-shaped flanges or hooks, or slotted box catches and the like) that can be engaged to lift or suspend the boxes. Although not preferred, the inventive mini-pallets can optionally be adapted for under-deck transport, in which case the inventive mini-pallet boxes when loaded under the truck may be slung from the J-hooks of a hanger assembly. The steel flat or strapping on the front and back walls and bottom is typically 1/8" thick stainless steel stock by 3-5" wide. The top strapping is typically 1-2" wide stainless steel strapping 1/8" thick.

Unlike the full-sized pallet box disclosed in our co-pending application, which employ eight, spaced feet forming pairs of slots on all four sides for using a forklift to move the large units, the mini-pallet box is on wheels. Typically, these are four-4½" polyurethane and stainless steel casters—two fixed and two swivel—that are lockable for maximum movability or stationary positioning, as needed. In addition, the inventive mini-pallet box preferably includes fork lift slots on two sides, front and back formed by six feet, three along the lower marginal edge of the front and back walls. Optionally, each set of front and back three feet may be connected by a relatively thin, horizontal plastic or metal skid plate that joins the bottom of the triad of feet. The fork lift slots are thus defined above the skid plate, below the bottom of the box and bounded on each side by the three feet. The skid plates prevent the box from falling off the fork lift forks, and also permit the box to be "skidded" over raised ridges, such as stairs or thresholds. Note that the casters are positioned in recesses between the corner feet along the short sides of the box, so that they do not interfere with the use of fork lift forks entering the long side (front or back) of the box. Optionally, the casters may be stem-type casters that are removably received in sockets emplaced in the four corner feet of the box.

The front steel sling exoskeleton panel of the inventive box includes a housing for an electronic lock and a hinged, flanged cover that, when raised completely covers the lock body, and includes a latch plate with a hole that engages the plunger of the electronic lock. In addition, a pair of spaced cam locks engage the lid strap tang slots. The cam locks enable the lid to be cinched down, hermetically sealing the lid to the box. The cam locks are also completely covered by the flanged cover or/and vertical channels in the lock cover plate. Thus, to resist tampering; there are no exposed parts that act as a purchase for a pry bar.

The preferred lock system is a hardened electronic lock mechanism that permits identification of which "keyholder" (approved access-person or organization) opens the lock(s), when the lock(s) is/are opened, and how long the lock(s) stay opened, and, optionally, the location. The locks are hardened with steel shell, bolt and plug face. Each key and lock is uniquely identified, and there are virtually unlimited unique lock codes. The open/close time parameters can be pre-set, actual opening and closing times are recorded and downloadable, either by direct connection of the key to a PC, or by connection of the box lock to a hand-held device, such as a PDA, or the openings/closings can be radioed to a remote, homebase. Thus if there is an attempt to open that is outside the authorized time, an alert can be radioed to a monitoring station service facility or service provider. By way of example, a suitable electronic lock is the NexGen high security electronic lock, Model 65 series, or Pal-Loc model, provided by Medeco Inc. of Salem, Va., USA, a division of Hillenbrandt Industries, Inc.

The locks and keys are uniquely identified, mating and programmable, including both at a home base and in the field, and store several thousand downloadable access events to provide a full audit trail. The programming includes configuring the key to authorize its use to open one or more boxes, to select the time, and by integration with the RF controller and GPS module in the box, the location at which the box can be opened or/and locked. Thus, the boxes can be both authorized-entry/unlock and destination restricted to prevent unauthorized keys or persons from opening and closing the container.

An important feature of the inventive pallet boxes is that they are each integrated (complete), and highly tamper resistant. That is, there are no loose parts that can be lost during use or storage, and the material is selected for strength to resist both casual and relatively concerted theft attempts. The lock is integrated in the exoskeleton, the top is flex-pry resistant, and the comm module includes location and links to sensor systems associated with the box (embedded into, secured onto, or disposed in the box cargo volume) to provide real-time state-of-the-container data.

The pallet boxes have lids that are preferably provided with substantially hermetic seals, for weather tightness, security and to assist in evaluation of contents. This feature provides security for the shipper and is of great benefit for shipping products requiring "privacy" and/or security, such as pharmaceuticals and biologicals, mail, ballots, and contents requiring high-security due to sensitivity of informational content. In combination with the seals, a port is optionally provided for evacuation of the container, or purging of the container with an anti-microbial or anti-pathogen gas, or pressurized with a security gas (which may include an anti-pathogen gas) to protect the contents or to expose a thief to a lethal or sub-lethal, incapacitating or marking gas or other fluid upon unauthorized breach of the box walls or attempts to pry open the box. The single or multiple port system is also particularly useful for evaluating the contents of the box. Thus the box may be pressurized at the departure point, and the pressure checked via the port valve (preferably a quick-disconnect type hydraulic female union) at the delivery end. Substantial variation in pressure may indicate in-transit loss of integrity, breach, or some change in contents. In addition, a sample of the atmosphere in the box can be obtained by withdrawal of the internal gas. In still another process embodiment, an inert gas can be introduced into one port, for example a secondary, inlet port on the lower left rear side of the box, and a sample of the gas withdrawn from the primary port on the upper right front face of the box. The inert gas can carry with it any entrained chemical vapor or bio-toxin signatures that can be analyzed by conventional chemical tests, or, in the field, with hand-held micro-channel reactant or electro-chemical sensor units. Thus, if an explosive charge or bio-hazardous material has been introduced into the box, say in a package or piece of mail packed in the box without knowledge of the shipper or mover, sampling the inert entraining gas provides a warning of the contents problem and the entire box handled appropriately to suppress or destroy the hazardous material without un-aware opening of the box.

The box may also be provided with a battery/condenser system so that an unauthorized person is shocked ("Tazed") with high voltage upon attempts to open the box.

As the inventive mini-pallet boxes are locked and the integrity verifiable, they can be securely left at the receiving moving warehouse for storage until the customer arrives to receive the goods. Indeed, the inventive pallet boxes permit elimination of shipping cartons, with the goods being unpacked directly out of pallet boxes. This reduces the carton cost, the carton packing cost, and the carton volume and weight. Indeed, in view of the robust construction and high strength of the materials of the inventive mini-pallet box heavy, wooden crating can be eliminated. Thus, high value and fragile goods can be securely moved in the inventive mini-pallet boxes and the crate-related costs eliminated.

Another common and accepted form of transit loss that the invention reduces is transit damage loss. The inventive robust, rigid and reinforced, integral container substantially and significantly reduces the instance of real transit damage, as well as potentially allowing shippers to lower their threshhold for damaged goods claims of the automatic allowance category.

In connection with tracking and enhanced security, each mini-pallet is provided with a sensing communications module comprising sensors, controller, RF transceiver, GPS locator unit, battery and trickle charger. The sensors are distributed through the box and optionally include an intrusion sensor system, such as a shock, breach or vibration sensor that is connected to, or in wireless contact with the controller to provide a silent or audible alarm. In a preferred embodiment, the intrusion sensor comprises a liner-type insert comprising a conductive screen mesh adhered to the outside of a thin, rigid sheet (of ABS plastic, for example) that is electrically connected to the controller. Another example of a preferred intrusion sensor is the emplacement of a vibration sensor on one or more walls, top and/or bottom to detect penetration attempts.

Other sensors that may be disposed in the box or in association with one of the side walls, top or bottom walls include ultra-short range battery-powered RF or hard wired sensors that report internal or external sensed condition data to the controller. The sensors can trigger alerts and alarms, e.g., audible or silent, such as warning horns or RF transmission alert of a breach attempt, or movement of the box out of a predetermined transport path or location (linked to a GPS unit in the box). The GPS unit inputs location data to the controller which sends out data burst transmissions on pager, cell phone or other network frequencies to relay stations or to one or more home base(s) for track and trace functionality. Instead of the screen, one or more RF sensor(s) can be used to detect breaching of the container walls, top or bottom, such as an IR, US (UltraSound) or light detecting sensor that sends a signal to the controller if an aperture as small as a crack forms in any of the box walls.

Optionally, one or more still or video cameras can be installed in each pallet box for monitoring of opening or conditions inside the box during shipment. A battery powered light source can be supplied in association with the camera.

Narcotics and explosives detection may be enabled with miniature reactive chemical sensors or electro-chemical sensors, such as a GE SteetLab unit. As above, a positive output can be linked to the controller for radioing an alert or in-box non-baseline, abnormal or anomalous condition.

The smart container data communication and management system includes sensors, locks, alerts, alarms, container "armed" status lights, data encoders, transmitters and/or transceivers, computer programs, data bases, and related equipment to enable activation, coding, decoding and use of the data communications system, including real time and past history display of status and location, and management and operation report generation. The inventive smart cargo-container monitoring and management electronic data communications system(s) include(s) container-mounted, fitted or embedded components, separate remote signal relays (towers and satellite), monitoring station components, and auxiliary equipment including locators (GPS locators) and locking systems. The home base monitoring station includes a computer system having a CPU in which is loaded data engine, display programs and web server or web browser programs to enable activation, operation and use by customers of the data system.

Each shipper, customer or other authorized tracker can access data on individual ones of the mini-pallet boxes, or groups of them, via a customer or user name and password on an SSL server webpage. The tracker can poll where the container is, and the location provided by the container's GPS/GSM unit will be displayed on a map. In addition, in the case of an anomalous condition being sensed, such as: unauthorized unlocking; attempt at tampering, entry or opening of the container; unlocking at an improper location; sensing temperature, humidity, chemical conditions, and the like, the home base or web site system will wake up and emit an alarm, including audio, visual, sending of e-mails, faxes and phone calls, to a selected number and type of individual for response. The remote monitoring aspects of the invention provides a method for movers, shippers, customers, and security/audit personnel to monitor from a single "home" base, many containers simultaneously, the number ranging easily in the thousands. Under the inventive system, the tracking personnel can be notified and check when anomalous events occur and can have a complete, verifiable handling report for each container from empty before loading to empty upon unloading at its destination, and with confidence in the security of the container along the route, including in the transport vehicle (truck, ship, rail, aircraft), in its origination facility, warehouses or transfer depots along the way and to destination unload or storage.

The inventive security system provides a unique identifier for each container in the field that is radioed to home base when the container is first put in use. Each container is pre-configured at home base (e.g., home warehouse, customer or mover's facility, manufacturing facility or the like), or in the field, e.g., at the site of the move loading, via the PIC program with a unique identification number or other data (name of customer, moving company, moving van ID, type of goods permitted to be shipped, etc), and its cycle of time for status reporting is pre-selected at that time. After loading and close of the lid, upon locking it is initialized or enabled, and thereafter the container reports its status, the time, or/and location back to home base on the predetermined timed cycle, e.g., every half-hour, more frequently at night, less during the day, etc.), or to pollers (very short range, long-life battery powered microprocessor-controlled RF transmitters that are placed at various sites in the van, around the warehouse, storage facility or customer location), or by readers (long range, 100-1500' depending on antenna) transceivers with the ability to receive and interpret the data from the container transponders, e.g., as the moving van rolls by a road-side reader tower, and then forwarding this information by wired or wireless communication to a computer or computer network for real time location and status data retrieval from the containers). The program at home base displays a map from the map program with each container or group of containers located thereon with a unique icon, and the status can be indicated in text or change of icon, e.g., by animating the icon, changing color, flashing, change of text, combinations of them, and the like. In addition, an audio alert signal can be emitted on the computer speakers when the sensor(s) or lock detects an anomalous event or unauthorized, untimely, or wrong destination attempts to open the container occur.

The inventive computer-based mini-pallet system permits complete management of the container security during transport, storage, loading and delivery, as a business, including communication via the Internet of container status and event reports, orders, billing, e-mail communications, and the like. The net result is that the features of the inventive mini-pallet permit true national and international shipping security capability, including user-friendly web-based operation, with capability to produce archival electronic and/or hard copy records of the entire loading, transport, warehousing, and unloading data, including a complete audit trail of opening/closing activity and location by date and time.

The controller/RF/GPS units are included in a module that is loaded in a special bay or recess in one of the legs of the box, or in other convenient location. A GPS unit can also be included in with the goods loaded therein at the time of sealing by the originating customer, mover, shipper or manufacturer. Customs or other security wires and seal systems may also be used. The lid lock may be programmable, e.g., activated by magnetic cards or keys, or of the push-button or dial type, to name a few examples.

It is preferred to include a loud, 60-100 DB battery-powered audio alarm system in the inventive smart mini-pallet container. Preferably the alarm noise-maker is disposed in the front wall of the container behind a speaker grille. This alarm is activated by simple magnetic or button type contact switch elements in the lid and top of the box wall, respectively, or may be connected to the intrusion sensor, such as the screen insert described above. The switch which arms or turns the alarm off is hidden behind the electronic lock cover plate. After unlocking the cover plate, the switch is accessible and is turned off so the top can be opened.

One particular application to which the inventive regular or mini-pallet boxes are particularly suited is functioning to transport securely or to function as ballot boxes. In many elections, including US local, state and national elections, and in internationally-monitored elections questions arise as to the verifiable integrity of the election process, that is, the day(s) ballots were cast, the collection of ballots or ballot boxes, their transport and warehousing, and ultimately to the opening and counting, and thereafter to warehousing pending any recounts or court challenges. As recently as the fall of 2005, in Washington state, ballot boxes containing significant numbers of uncounted ballots turned up many weeks after the election during recounts and court challenges. In that case the election was decided by less than 200 votes out of millions cast. Thus, the inventive mini-pallet boxes can be modified with a slot that is closed or covered by a steel plate associated with the auditable lock described above and provided with the GPS and controller system Each box is identified and associated with a specific key/lock pair, and only authorized persons are authorized to open and close the ballot slot at authorized times, and the closed, filled, uniquely identified ballot box can be tracked, traced and located at all times. Attempts to open or breach at unauthorized times, by unauthorized keys, persons or locations, can be monitored by the box sensors and reported by the RF comm functions. Thus a complete audit trail can be archived and provided in hard copy by the appropriate authorities or secretary of state, UN Monitor or the like in accord with this method aspect of the invention. As an alternative, either regular or mini-pallet boxes can be provided as shipping containers of regular-sized conventional ballot boxes, and the same audit/tracking functions and verification/reporting applies.

A first embodiment of the ballot slot closure comprises providing a second, electronic lock assembly which releases a pivotable flanged plate (like the one at the front of the box), but at the back of the mini-pallet box. This has its own separate key. The mini-pallet ballot box is delivered to the elections commission agency, it is opened to verify it is empty, it is locked, the rear ballot slot cover plate is rotated to the "covered" position and locked. Then the prepped ballot box is delivered to the polling location, the authorized key-holder opens only the ballot slot cover as the key will not open the front of the box, the ballots inserted during the voting period, the ballot slot is closed and locked with the authorized key, and the smart ballot box returned to the election commission. At the appropriate time the front of the box is opened with the separate authorization key, the ballots counted, replaced in the box, relocked and stored pending final certification of the voting results.

In another embodiment, internal to the top lid a sliding, spring-biased slot closure plate is fitted. To open the slot, the polling place authorized key opens a rear cover, a lever is pulled down, retracting the slot-closure plate against a solenoid actuated catch. The opening time is recorded in the lock body. When the poll closure time arrives, a timer in the lock energizes the solenoid to retract, and the spring pushes or pulls the plate back to the start position, closing the ballot slot. A spring biased catch can engage the slot in the closed position to prevent being pried open. Any attempts to tamper with the ballot box are sensed, detected, recorded, archived and silent or audio alarms sent or sounded. Thus, a totally verifiable activity, minute-by-minute status, and location log can be sent, downloaded and archival record produced and kept. This permits a verifiably auditable tamper-free handling of the ballot boxes with their ballots.

A ballot counter mechanism, mechanical, optical or electronic can be provided in association with the ballot slot or the mini-pallet ballot box. For example, wire contact feelers can be provided in association with the slot so that as each ballot is inserted it is counted. In an alternate embodiment, the ballot can be provided with a magnetic stripe, an optically readable bar code, or other optical or electronic ballot identifier so that as they pass through the slot, they are detected, read and counted by the corresponding sensor/readers. Any conventional mag stripe, bar code and mechanical counters may be used. The ultimate count of ballot removed from the box must then agree with the slot count to provide an integrity check. A time record can also be kept by the lock memory along with the count to provide election data showing the voting pattern throughout the voting period; this also assists in integrity verification.

In still another embodiment, an LCD count-down timer (powered by a watch-type battery) can be installed in the lid or a side wall, preferably next to the ballot slot, so that polling-place staff and observers can monitor the time remaining until the ballot slot closes. The timer can sound a buzzer a few minutes prior to the slot closing, so that any last moment ballot can be inserted. In addition, small sales ticket type printers can be mounted in association with the slot so that as the ballots are inserted in the slot, they are marked with some security or count-ID type indicia. Thus, an invisible ink ballot number can be jet printed onto the ballot, such as an ink that is visible only in UV (black light) frequencies, either prior to ballot distribution to voters or upon insertion of the ballot into the slot. This assist the election officials in verifying that the ballots are authentic and were cast at the location, time and place printed onto the ballot at the time of insertion in the box. In case of bad weather, the timer can be preset for polls to close later. In such events the preferred embodiment may be the external hinged lip that is manually locked.

In another embodiment, particularly useful for disposal of personal or business confidential documents or government or diplomatic documents requiring high security, a shredder can be incorporated in association with a slot in the box, so that shredded documents are captured in the mini-pallet box for transport to ultimate destruction, e.g., incineration. The shredded can be mounted on top of the box so that the shreds feed into the box via a slot (as described and secured above), or a shredder can be secured to or built into the lid so that the shredder is an integral part of the box or lid. This embodiment is particularly useful for shredding of diplomatic documents during emergency conditions. In such cases since the interior of the box is plastic, paper break-down solvents, chemicals or bologicals (cellulose metabolizing microbes) may be included within the box, so that the shreds are further reduced without need for transport for incineration or other disposal. Such compounds can be encapsulated within the box and activated or released from the exterior or by activation of the shredder.

With respect to security aspects, an important alternate embodiment of the invention comprises making the box walls, top and bottom of explosives blast containment, resistive or attenuation material (herein "blast controlling material"), or providing a liner of such materials that fits inside the box. Thus, any such suitable blast controlling material that is integral to the container wall, top and bottom panels or a liner may be used. Exemplary highly energy absorbent materials that may be used are honeycomb or corrugated laminates, or multi-layer composites, such as but not limited to: fiber-metal laminates; multi-layer fabrics such as Keviar bullet proof fabric laminates, Nomex laminates and the like; polymeric layer-metal honeycomb or corrugated core laminates; open cellular core laminates; foam filled core laminates; and the like. By way of example for a liner a useful material is a 3 mm-thick multi-layer laminate in a sandwich structure of self-reinforced polypropylene fiber and aluminum, such as is available from Propex Fibers of Austell, Ga., USA. Another type is honeycomb or corrugated sandwich panels comprising a honeycomb/corrugated core material bonded between facing skins, in which the core and skins type and thicknesses can be selected for a particular application. Examples include aluminum cores bonded to skins of aluminum, woven glass cloth impregnated with epoxy adhesive, both available from Technical Resin Bonders, Ltd. of the UK, aluminum, polymeric foam or honeycomb/corrugated plastic bonded to polypropylene skins, and the like, currently available from a wide range of commercial sources. The honeycomb/corrugated layer generally acts as a crush element capable of absorbing blast energy. Still other blast attenuators include: composite shielding of rubber, pusher plate and crush element layers; or soft expanded foams; strap-type lattices embedded internal of the container walls.

Still another type of blast mitigation that can be included in the inventive regular or mini-pallet boxes are 1-3" layers of BlastWrap brand blast mitigation material available from BlastGuard, International of Clearwater, Fla., that can be emplaced as an inner liner in the box. This material has a "bubble wrap" geometry, that is, a pocket is formed in a first polymer layer, filled with a dry attenuating media, typically perlite with an extinguishant coating, and a top polymer layer is heat sealed thereover. The pockets range from about 3" to 10" square, and the material has an areal density on the order of 0.6 lbs/s.f. for 1" layer to about 2.2 lbs/s.f. for a 3" layer. The BlastWrap material is commercially available from BlastGuard, International, Inc. of Clearwater, Fla. The BlastWrap brand blast mitigation liner can quench a fireball, reduce blast pressure, prevent reflected blast pressure and minimize damage, functioning to smear shock, dampens reflected shock and prevents shock "holing". Such blast mitigation layers can be used in conjunction with other ballistic or fragment attenuation materials, such as Kevlar or Nomex fabrics, the honeycomb/corrugated laminates and the like described above. In a particularly preferred configuration for special, highly sensitive uses, the pallet boxes can be molded or formed with walls, floor and lid of composite honeycomb or corrugated laminates configured with recesses for filling with blast mitigation perlite coated with fire suppression chemicals, and a skin of polypropylene heat sealed over the pockets forming a continuous inner liner.

The presently preferred power source(s) for the electronics comm module, the sensors, the status lights and the alarms comprise rechargeable batteries, with a recharge male plug provided at an exterior wall. A seal cap is provided to prevent plug tang damage. Another important alternative method of recharging is to provide at least one kinetic power generation device comprising a high flux magnet oscillating through the center open core of a wire coil, and having compression springs at each end of travel to provide a rebound movement of the magnet. Currently, such kinetic power generation assemblies are commonly available in kinetic flash lights. In the present invention, at least one kinetic power generation assembly, without the LED can be provided so that the motion of the box in the moving van during travel results in oscillation of the magnet, providing electricity source for storage in a capacitor or rechargeable batter. It is preferred to provide two, or most preferred, three such devices, one oriented in each of the three orthogonal orientations, to take advantage of back/forth (X direction), side-to-side (Y direction), and up/down (Z direction) motion of the vehicle to charge the battery or capacitor. These kinetic power devices are sufficiently small that they can easily be disposed in the walls of the pallet box. For example, the Z device can be in a vertical corner, the X and Y at the juncture of the floor with a wall, one located at the juncture of the front or back wall and the other at the juncture of the orthogonally disposed left or right side wall.

One skilled in the security art will appreciate that any desired level of security can be employed, dependent on the value and need, such as national security, anti-terrorist, intellectual property confidentiality, or other such need.

BRIEF DESCRIPTION OF THE DRAWINGS

The invention is described in detail below by reference to the drawings, based on photographs of the inventive box in which.

DETAILED DESCRIPTION, INCLUDING THE BEST MODES OF CARRYING OUT THE INVENTION

The following detailed description illustrates the invention by way of example, not by way of limitation of the scope, equivalents or principles of the invention. This description will clearly enable one skilled in the art to make and use the invention, and describes several embodiments, adaptations, variations, alternatives and uses of the invention, including what is presently believed to be the best modes of carrying out the invention.

In this regard, the invention is illustrated in the several figures, and is of sufficient complexity that the many parts, interrelationships, and sub-combinations thereof simply cannot be fully illustrated in a single patent-type drawing. For clarity and conciseness, several of the drawings show in schematic, or omit, parts that are not essential in that drawing to a description of a particular feature, aspect or principle of the invention being disclosed. Thus, the best mode embodiment of one feature may be shown in one drawing, and the best mode of another feature will be called out in another drawing.

All publications, patents and applications cited in this specification are herein incorporated by reference as if each individual publication, patent or application had been expressly stated to be incorporated by reference.

Figure 1:
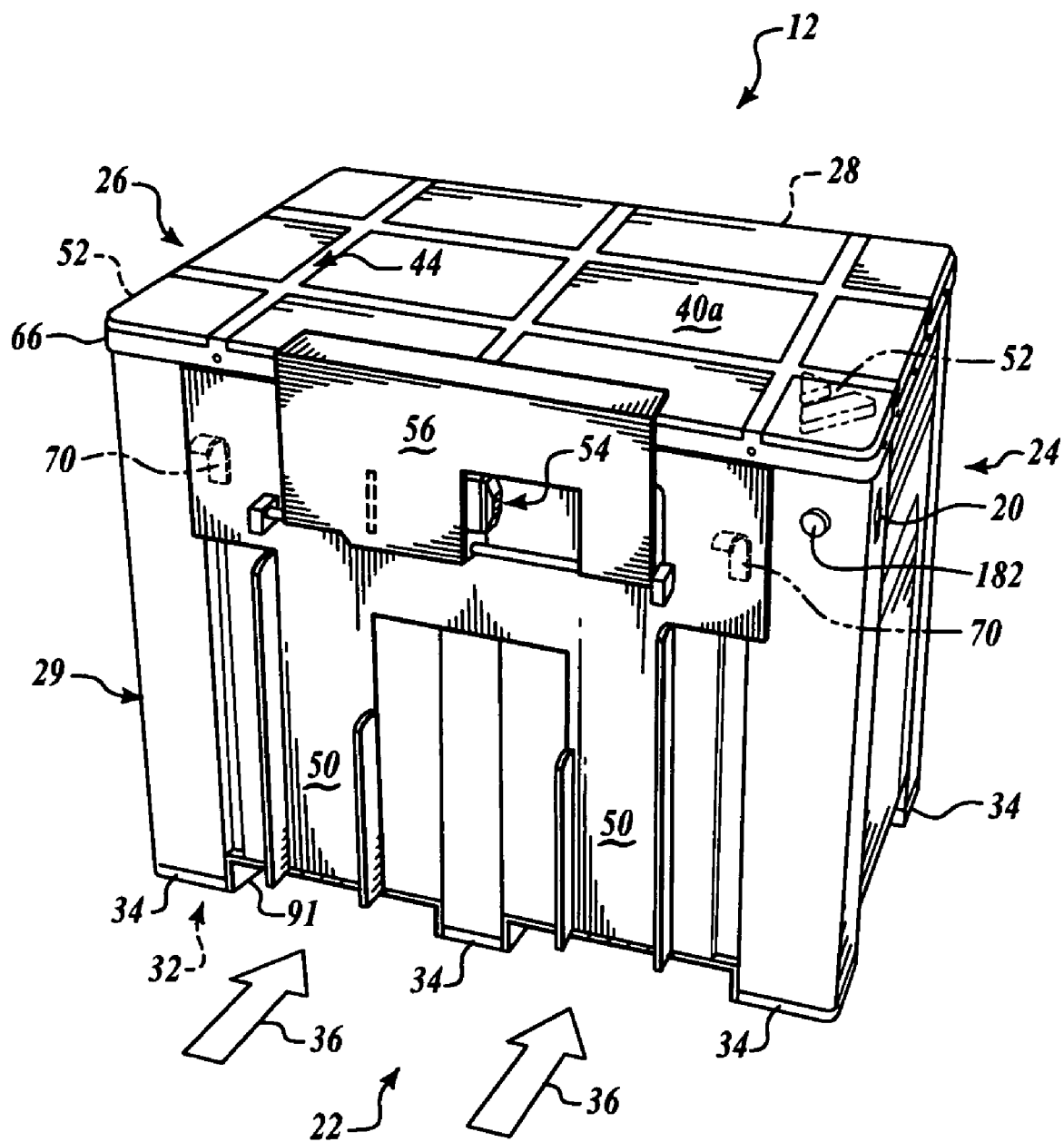
FIG. 1 is an isometric view of the inventive smart mini-pallet box cargo container, closed and locked, and without casters in this version.
Figure 2:
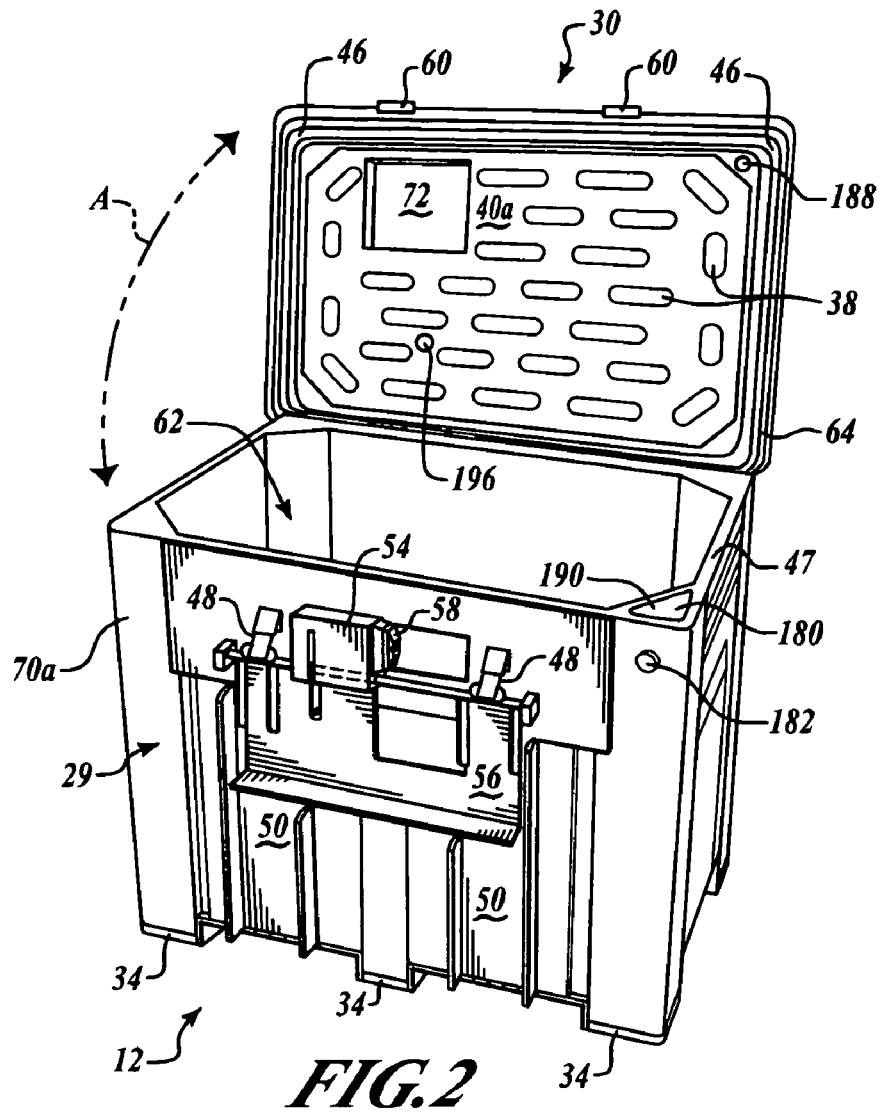
FIG. 2 is an isometric view of the inventive smart cargo container of FIG. 1 with the front lid lock assembly opened and the lid opened.
Figure 5A:
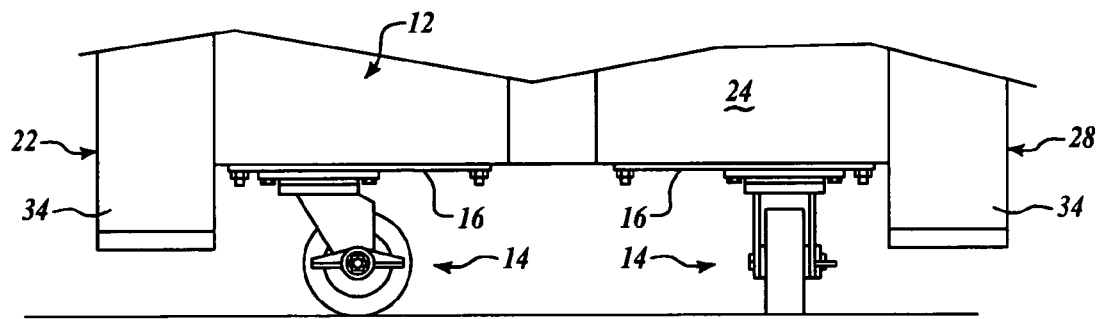
FIG. 5A is a right side elevation of the lower portion of the inventive smart mini-pallet box showing casters.
Figure 5B:
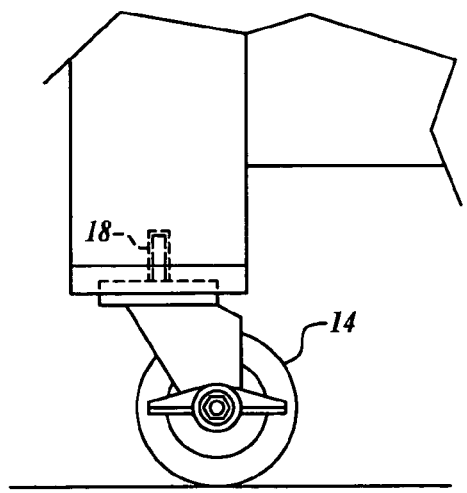
FIG. 5B is a partial side elevation of a corner and foot of the inventive mini-pallet box showing an alternate stem-type caster fitted in a sleeve in the foot of the box.

FIG. 1 shows a first, preferred embodiment of an inventive smart mini-pallet box cargo container 12 in the closed and locked state. FIG. 2 shows it open. The wheels or casters are not shown in these figures in order to not overcomplicate the figures; see FIGS. 5A and 5B for that feature. The container has a body 29 and top 30 defining a cargo volume 62 interiorly thereof, including a front side wall 22, spaced side walls 24, 26, back side wall 28, openable top 30, and bottom 32 (see FIG. 6D), with spaced feet 34 providing access 36 for front and back forklift access. The smart container can be lifted with a fork lift or pallet jack, and can include handles on one or more sides, preferably on the right side 24 and the left side 26 secured to the respective side walls (not shown) for manual handling by movers by rolling on the casters as shown in FIGS. 5A and 5B. Optionally, hanger brackets 70, here shown in the form of inverted J-hooks, may be provided for lifting or suspension of the inventive mini-pallet boxes. Hanger brackets may also be configured as channels with cross bars, in which case the width may be on the order of 4-6" so that these brackets, typically placed on the front and rear face locations as shown, can also be used as manual handholds. Optionally, the top can include corner bosses 52 (one being shown in order to not complicate the figure) which fit in recesses in the feet. Where the casters are located in the bottom of the feet 34, see FIG. 5B, the bosses can include a slot to receive the caster wheel so that caster-mounted mini-pallet boxes may be stacked if desired. Alternately, a straight-forward spacer system can be employed between the top of one mini-pallet box and the casters of one stacked on top of it. Since the casters have locks, the stacked boxes are stable.

The instant mini-pallet container includes wheels, is specially dimensioned to fit through doorways, and is auditably, verifiably secure by having security sensors, alarms, anti-pry latches, electronic locks and audit trail keys and communication systems. The access-controllable locking system is auditable, and the pallet-box type container is trackable and pollable to determine its security condition (or state) and its location, access and security condition history. Thus, those features together with its exoskeleton harness and lid locking system, the mini-pallet container is a "rolling smart, secure container system" being both secure and "aware", in that it can ascertain its location, condition and history throughout its use. Any selected amount of memory capacity can be integrated in the electronics to provide an extensive auditable and downloadable history file; in that aspect of the functionality, the inventive smart container "knows" its handling history.

Figure 4:
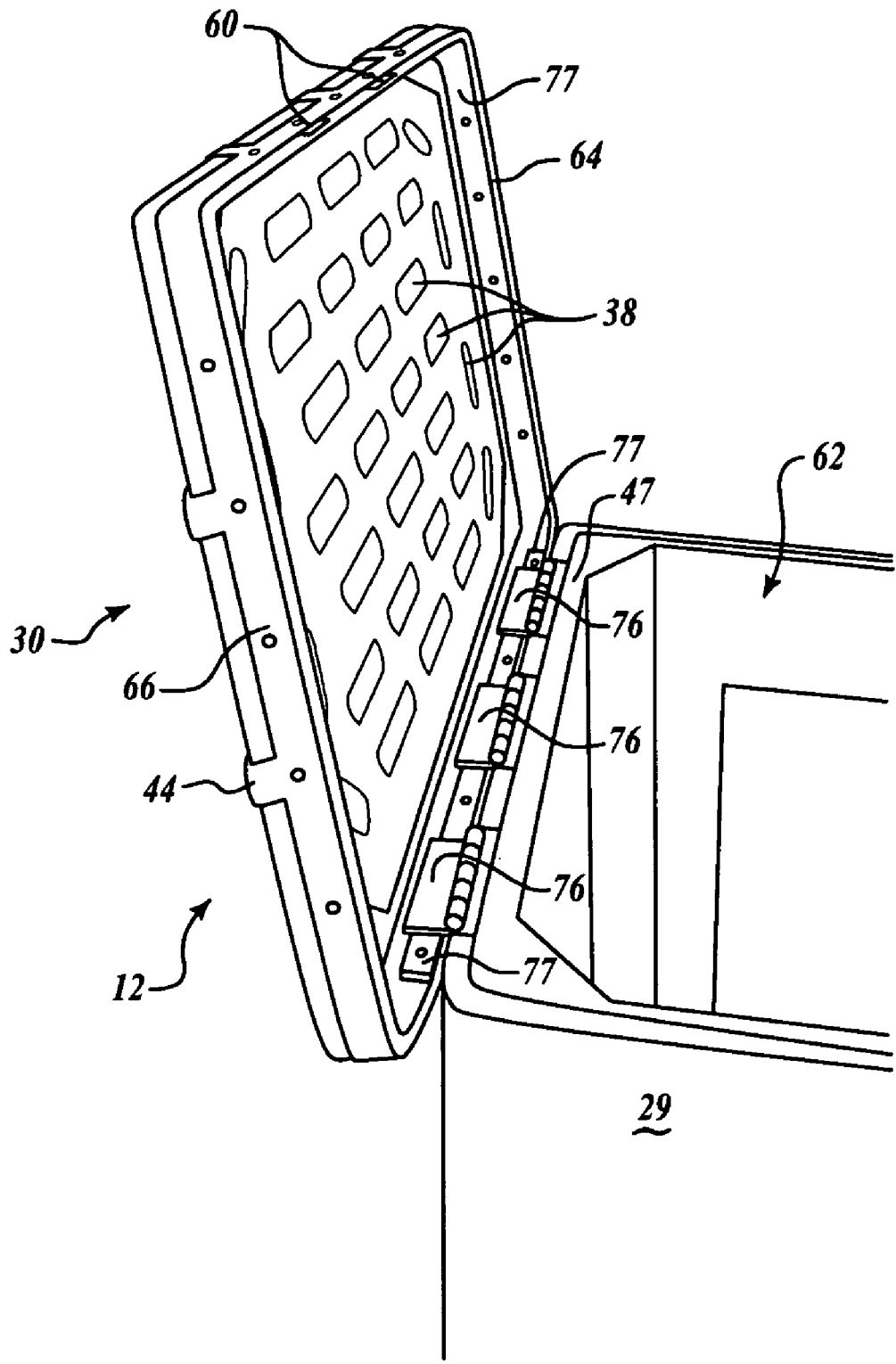
FIG. 4 is an isometric from the left side of the inventive smart mini-pallet box cargo container with the lid fully opened, but not removed, showing the rear hinge attachment to the rear wall of the container body.

As shown in FIG. 2, the smart mini-pallet container 22 preferably includes a single panel top lid that is hinged at the back (see FIG. 4). The lid 30 can be opened once the lock 54 of the container is unlocked and the flanged lock cover 56 is lowered. Compare FIG. 1 with FIG. 2 An exoskeleton-type reinforcing system includes interlaced lid strapping 44, lid perimeter steel band edging 66 and front, rear and bottom exoskeleton panels (80, 82 and 84, best seen in FIG. 6A). The front and rear panels include channels 50 and hinges 86 at their bottom edges (best seen in FIGS. 6A and 6B). In addition, for under-slung transport, the smart mini-pallet can optionally can include hanger brackets 70.

Arrow A shows the motion path of opening and closing the lid 30. Note the lid rest just past vertical; that is, it opens more than 90° for full access to the load volume of the box 62. Note the recesses 38 in the inside surface of lid 30. These provide 3-dimensional structural strength as well as protected, retaining spaces for electronic sensors inside the box 12 or for incorporation of blast attenuating material, fire suppression compositions or the like, as described in more detail below with reference to FIGS. 6E and 6F. As shown the recesses are spaced relatively far apart. The geometry and spacing is determined by the functionality, and one skilled in the art can easily make appropriate adjustments to the configuration as needed. Recesses for security/tracking electronics 72 may be provided in the lid, although the preferred location is in the body 29. The feet are not considered a suitable location for location due to ease of breaching, damage or the feet being simply sawed off. The floor likewise is considered not only slightly more suitable due to the shielding by the exoskeleton and the potential for damage. In contrast side wall and top locations are preferred as breach of a side wall can also be considered as an attack on the electronics, such that alerts relating to electronics failure, breach or attack can be linked to any wall or lid breach sensed. The lid is also a suitable place for sensors 196, the function of which is described in more detail below.

Figure 3:
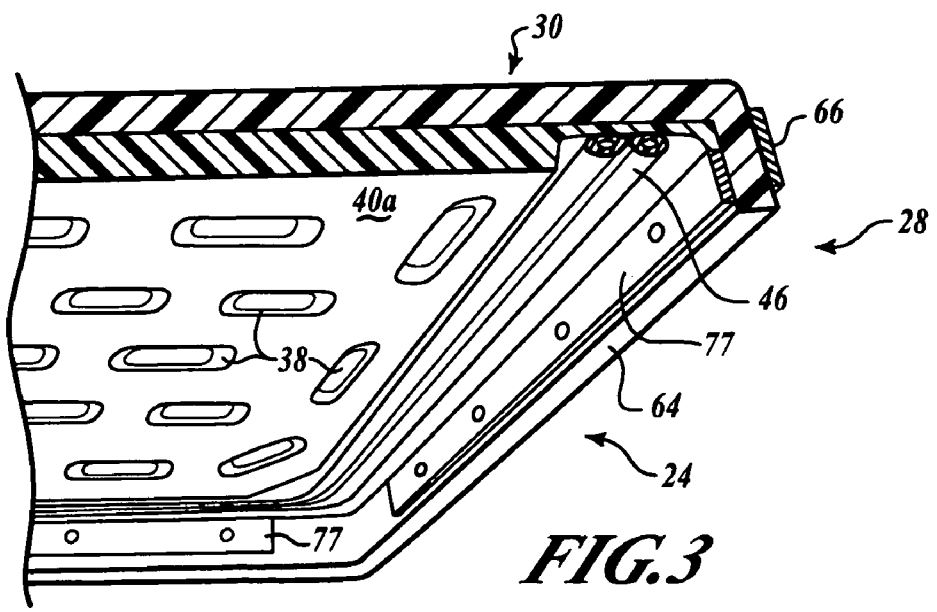
FIG. 3 is an isometric close-up of the inside of the lid, with the front lip removed to show the section view and showing the seal strip.

FIG. 3 is an isometric enlarged view, partly in section of the inside of the lid 30, showing the seal strip 46 and metal, anti-pry reinforcing bar 77 bolted through the lid lip 64 to lid perimeter steel band 66. Hinges Rubber or polymeric foam lid seal strip 46, e.g. urethane foam, extends around the inside perimeter of the lid, suitably positioned to contact box lip 47 when the lid 30 is closed, thus providing a an essentially hermetic gas and water-tight seal. In this figure, the lid is shown as a two-layer construction, but it should be understood that any type of large panel construction may be used, such as tri-layer (tri-sheet) or more, and a wide variety of internally molded ribs, corrugations (sinusoidal or angled), channels, posts, cells, ridges and the like may be employed, with the lid and wall construction being either hollow or foam filled to provide suitable rigidity. As noted below with respect to materials of construction, a wide range of suitable rugged materials and configurations may be used depending on function and desired service life consistent with economics of leasing or sale, including composites, laminates, multi-layer heat, solvent or glue-bonded multi-sheet constructions.

FIG. 4 is an isometric of the back end of the inventive smart cargo container 12 with the lid 30 fully opened, but not removed, showing the rear hinges 76 attached to the container lip 47 via the reinforcing strap 77. Lid 30 remains upright because of rear hinge stops 96, best seen in FIG. 6C. With lid 30 in this position, the load volume 62 is completely accessible for loading and unloading cargo.

FIGS. 5A and 5B are side elevations of the casters 14 emplaced either in the recess between the feet 34, FIG. 5A, or shank and socket type mounting 18 in the bottom of the feet, FIG. 5B. The caster mounting plates 16 of FIG. 5A are bolted into the bottom of the box 12.

Figure 6A:
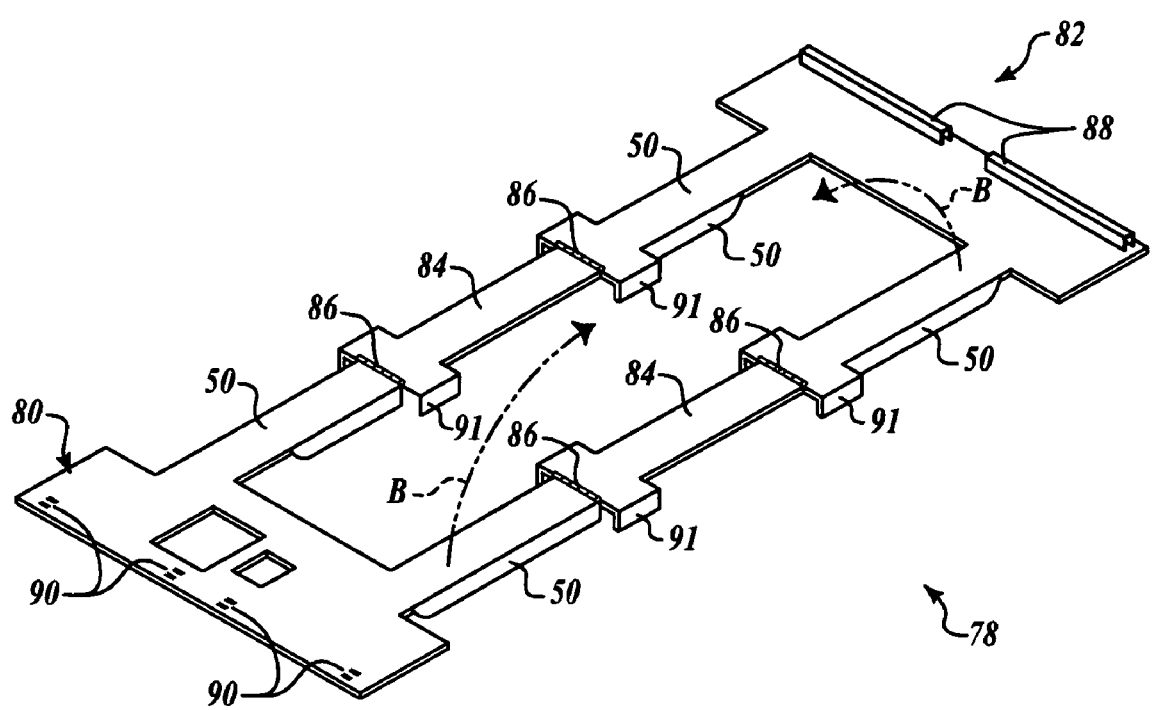
FIG. 6A is an isometric of the inventive mini-pallet container body hinged exoskeleton.
Figure 9:
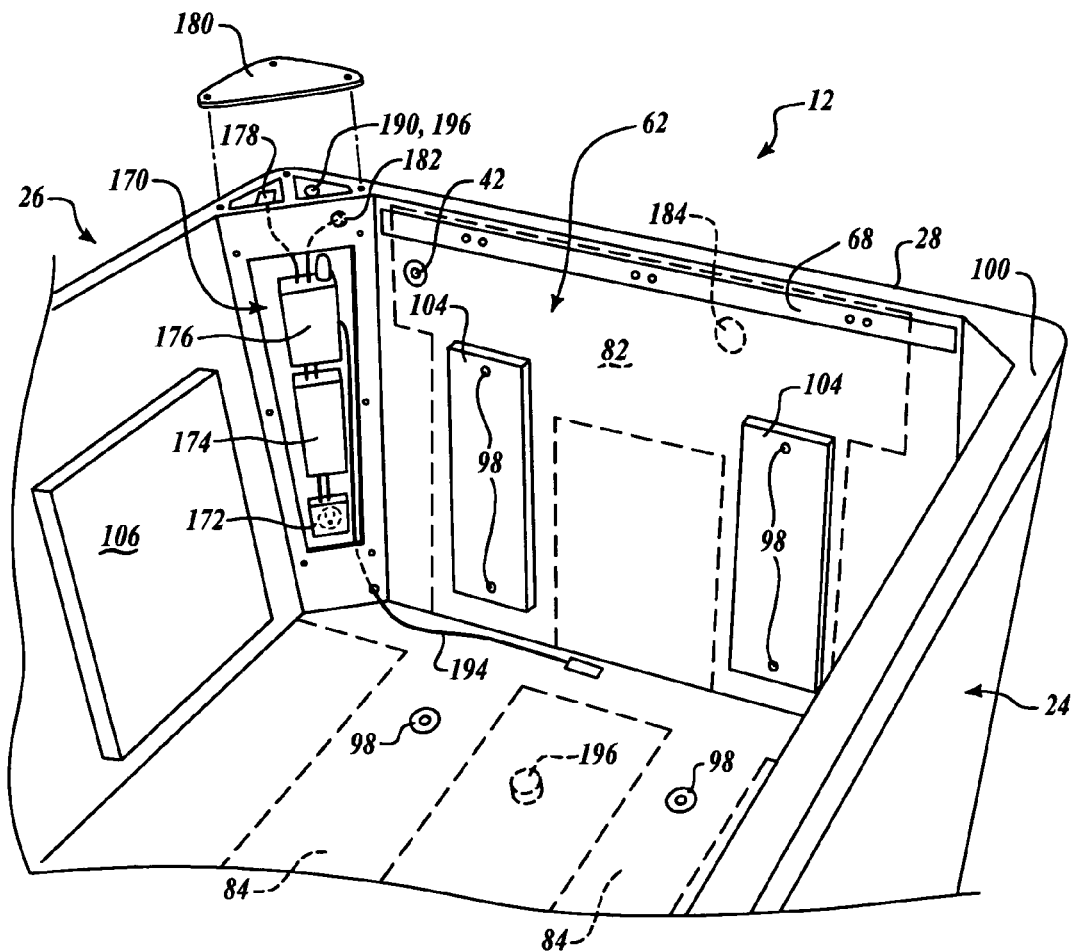
FIG. 9 is an isometric of the body interior reinforcing plates bolted through the box walls to secure front and back end wall exoskeleton panels and showing the electronics for the "smart" functionality of the box.

FIG. 6A is an isometric of the inventive container body hinged box exoskeleton 78, comprising front exoskeleton panel 80, bottom exoskeleton panel 84 and rear exoskeleton panel 82. When the molded plastic box is placed on bottom exoskeleton 84, exoskeleton hinges 86 permit front exoskeleton 80 and rear exoskeleton 82 to be pivoted upward into place as shown by Arrow B, and bolted through the front and back side walls of the box (best seen in FIGS. 6B and 6C). Likewise, the bottom panel 84 is bolted through the floor of the box as seen in FIGS. 6D and 9.

Visible on front exoskeleton panel 80 are slots 90 for U-channel reinforcements 88, such as seen on the rear panel 82. Tabs on the U-channel pieces fit into slots 90 and are welded into place on the exoskeleton (shown installed on rear exoskeleton 82 in this figure). These U-channels are located to fit into molded recesses 89 (shown in FIG. 6B) in smart container front 22 and back 28. Note the vertical channels 50, which provide reinforcement to the exoskeleton front 80 and back 82. The vertical flanges 91 on the bottom panel 84 frame the sides of front and back fork lift channels 36a, 36b formed by box feet 34 in box bottom 32 (seen in FIGS. 2, 6A, 6C and 6D.

Figure 6B:
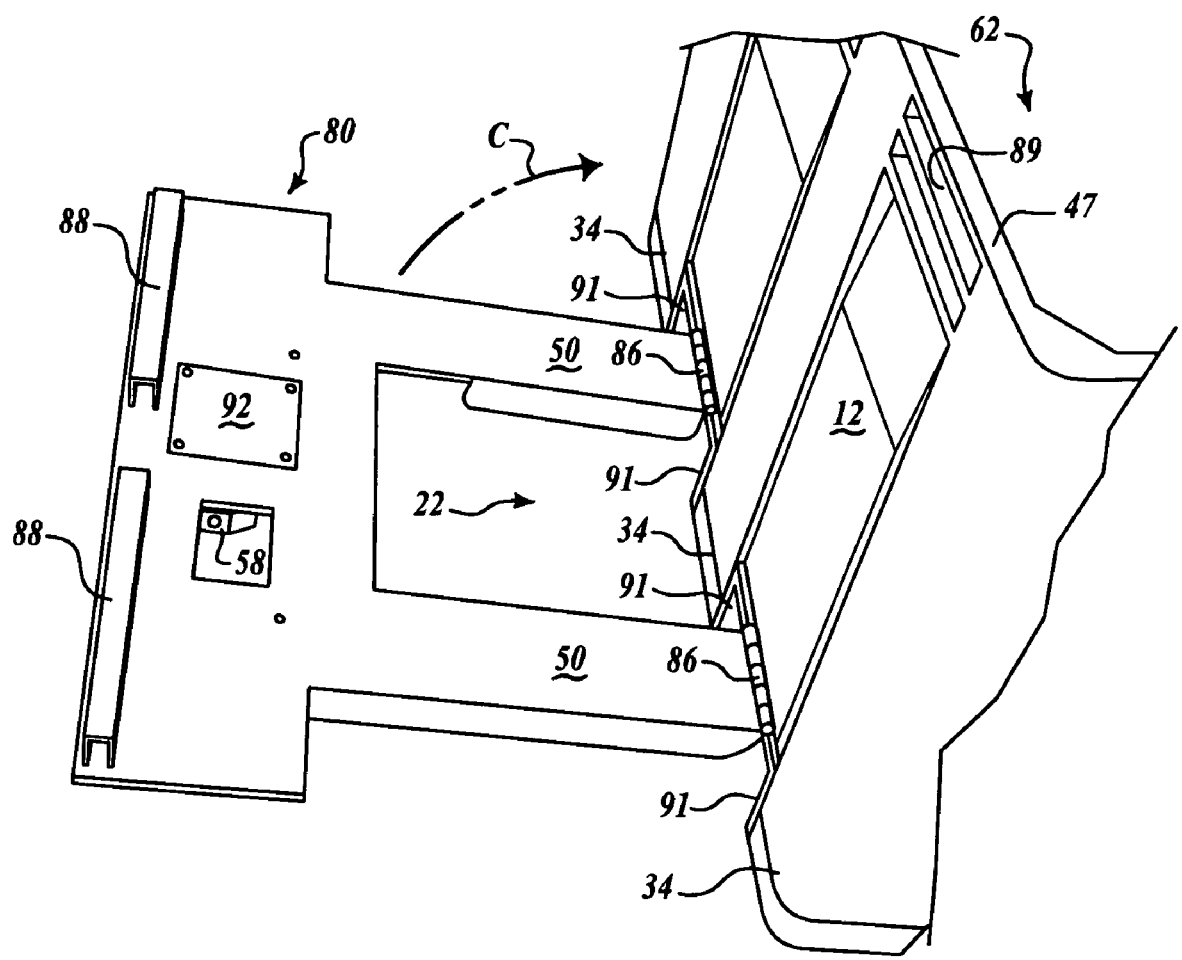
FIG. 6B is an elevated isometric view of the front section of the body exoskeleton with the inventive mini-pallet box being placed over the exoskeleton of FIG. 6A before the exoskeleton front panel is raised and secured to the front of the box.

FIG. 6B is an elevated isometric view of the front section of the body exoskeleton panel 80 before being raised and secured to the front 22 of the box 12. Arrow C shows the pivot path of front exoskeleton panel 80. Visible in this figure is the lock assembly rear access panel 92, which covers lock body 126 (best seen in FIG. 8B), and the lock key plate 58. Note that when exoskeleton 80 is in the raised position, U-channel reinforcement pieces 88 fit into molded recessed areas 89 in box front 22.

Figure 6C:
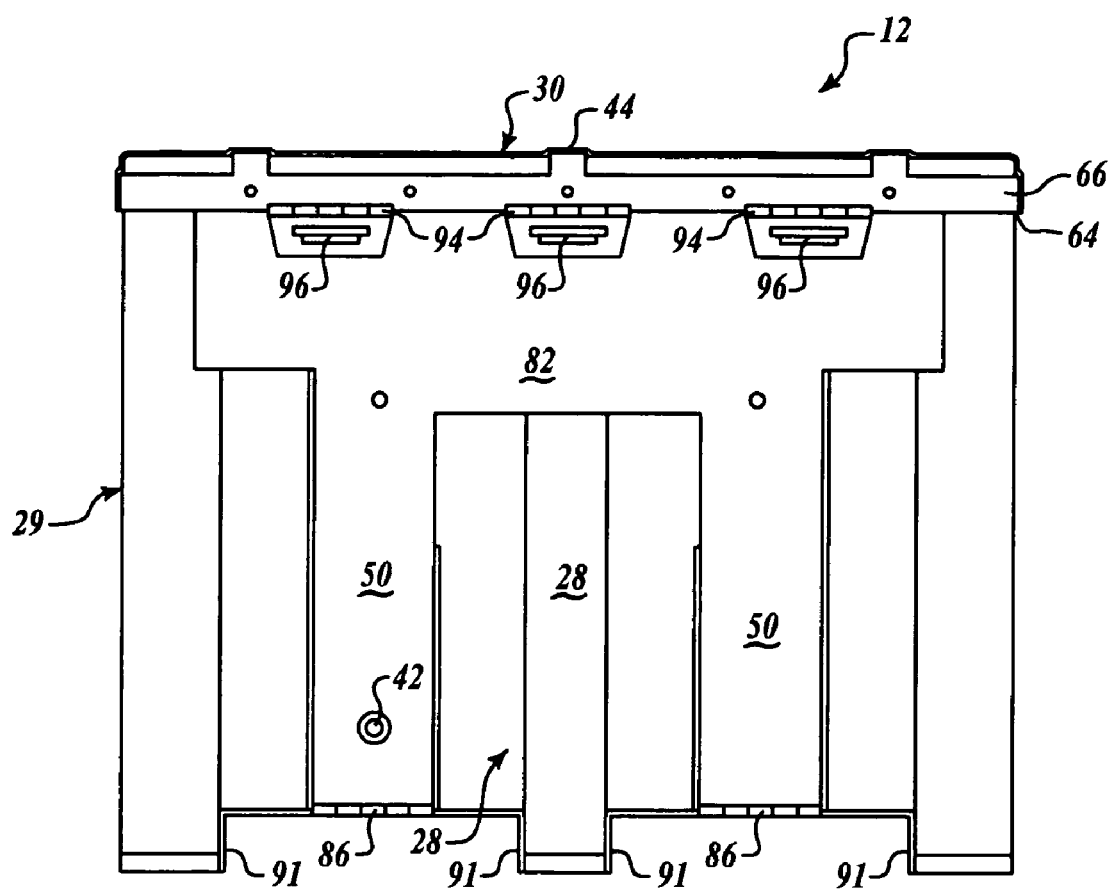
FIG. 6C is a back elevation view of the rear exoskeleton panel.
Figure 6D:
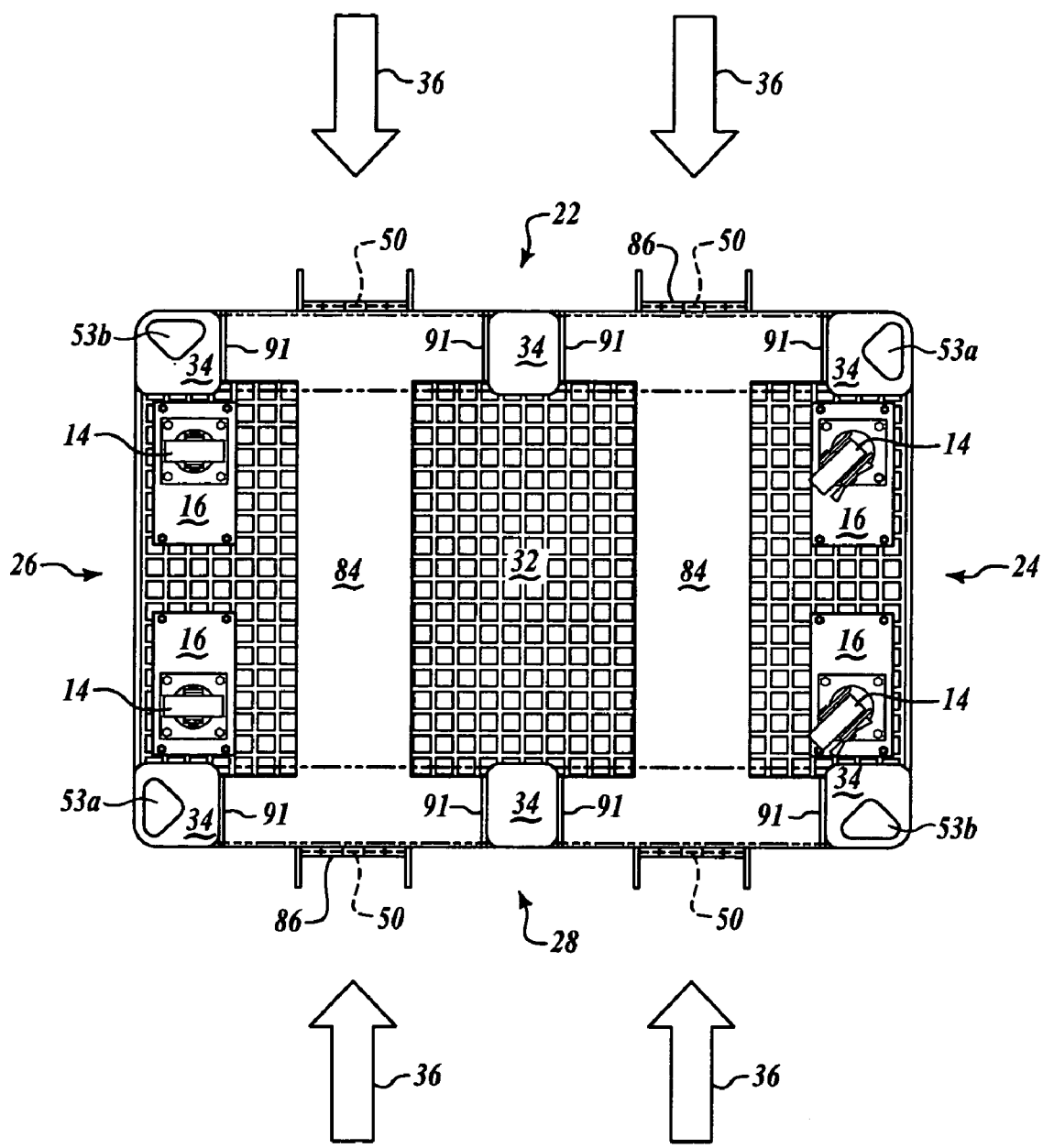
FIG. 6D is a view of the bottom of the inventive smart mini-pallet cargo container showing the center exoskeleton panel and the casters fitted in the side wall feet recess.

FIG. 6C is a back elevation view of the rear exoskeleton panel 82 installed on the box 12. Clearly visible in this figure are the rear hinge stops 96, which are in this embodiment angle brackets that retain box lid 30 in the upright, folded position described and depicted in FIG. 5. Where the box is adapted for under-slung transport mode, appropriate hanger brackets (not shown) would be secured to the exoskeleton 80 in suitable locations, such as to the left and right and just below the left and right rear hinges 94. Lid exoskeleton 44, which is angled around lid lip 64 and underneath lid perimeter steel band 66, provides strength and security to lid 30. A second female quick disconnect port fitting 42 is shown in the lower portion of the left channel 50. In combination with a first fitting on the upper left of the front face 22 as seen in FIG. 7B good gas flow and distribution in the box interior is achieved.

FIG. 6D is a view of the bottom 32 of the inventive smart cargo container showing the center (bottom) exoskeleton panels 84 and the stacking recesses 53 for receiving lid bosses 52 of a container 12 on which it optionally may be stacked. Between each pair of bottom feet 34 is forklift access 36 (from front 22 and back 28). The bottom panel 84 is bolted to the box bottom by a plurality of bots 98. The flanges 91 frame the fork lift entries 36 front and back. Lid bosses are suitably oriented, e.g., in diagonal mirror arrangement, to permit multiple boxes to be stacked with box fronts 22 aligned, or at 180° (ie with one box front 22 above or below another box rear 28). A skid plate 40 bridging between the bottom of the three feet on front and back walls may optionally be provided, see FIG. 6E.

Figure 6E:
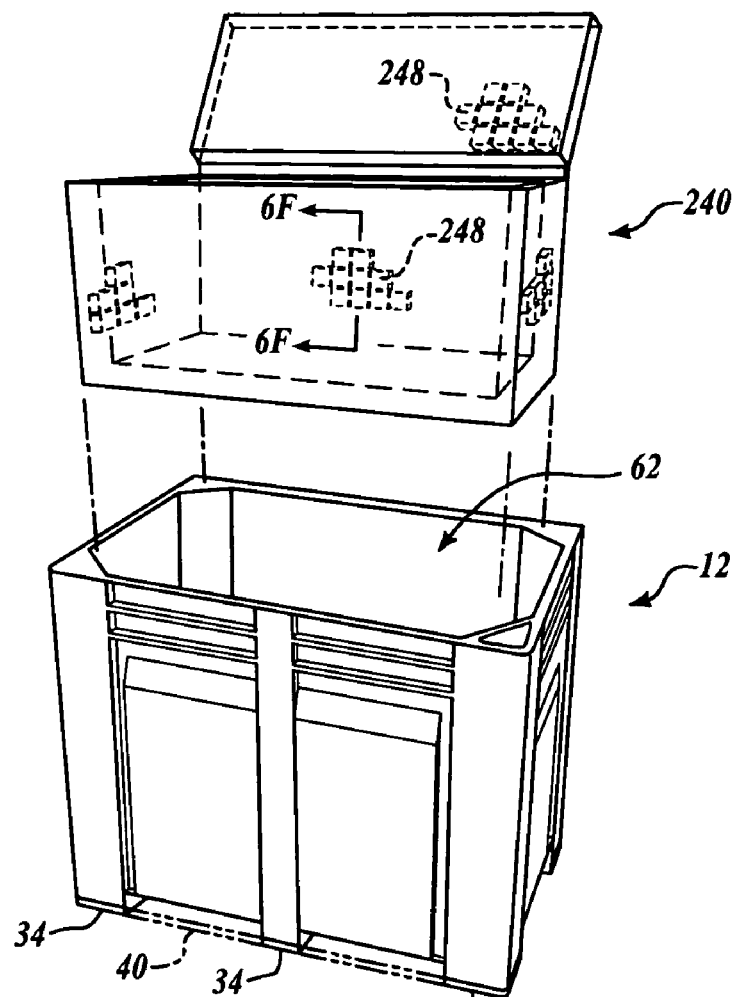
FIG. 6E is an exploded isometric of the inventive mini-pallet box, simplified with the exoskeleton and lid removed in order to show an exemplary blast blanket insert.
Figure 6F:
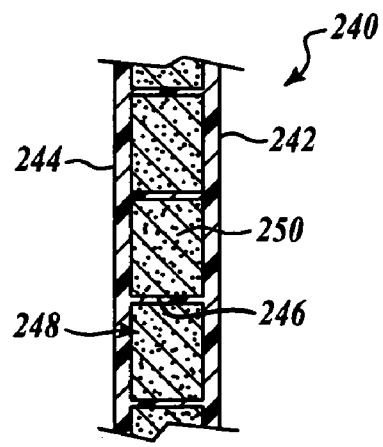
FIG. 6F is a partial section view through the walls of the blast blanket showing the blast attenuating material in the "pockets" and sealed with a plastic cover sheet.

FIGS. 6E and 6F illustrate a second embodiment of blast attenuation construction, in this case a blast insert 240 comprising spaced plastic sheets 242, 244 joined by transverse ribs 246 to form a plurality of pockets 248 containing a granular blast attenuating material 250, such as perlite, preferably coated with a fire suppressant compound. In the exemplary configuration shown, the insert has four walls, a top and bottom. However, where the top lid is a multi-sheet thermoformed construction with a plurality of voids, cells or channels between layers, or cells 38 are formed in the lid as shown in FIGS. 2-4 the cells 38, or the voids can be filled with the granular blast attenuating material. Where the cells are filled, they can be sealed in with a sheet of heavy plastic. The same construction can be used for the bottom, in which case the insert may be configured solely for the walls. It should also be understood that one or more layers of the bin body and lid can include one or more layers, particularly on an exterior layer of fire retardant coated, modified or impregnated plastic.

Figure 7A:
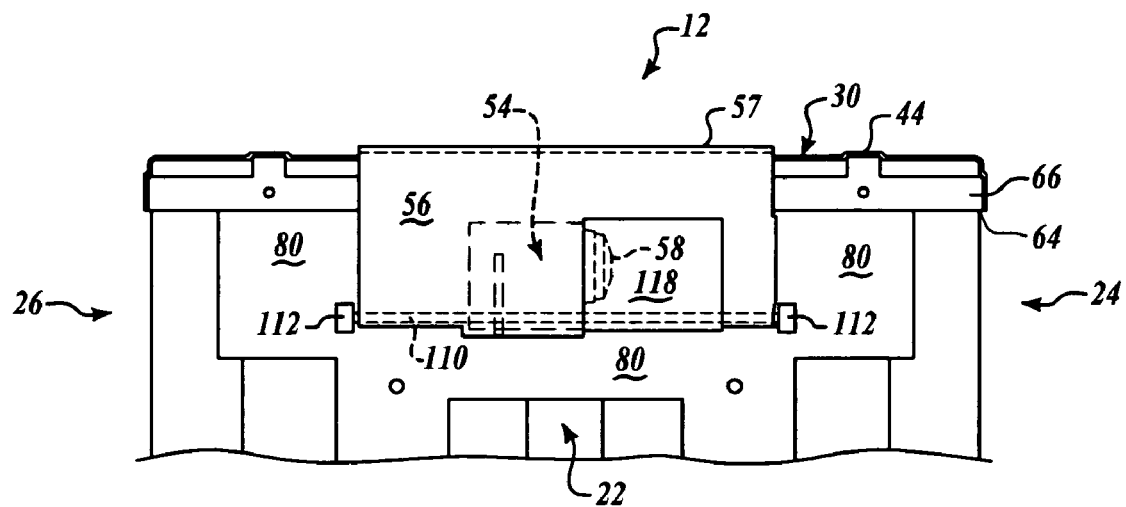
FIG. 7A is a partial front elevation view of the lid locking assembly with the flanged lock cover in the raised, locked position.
Figure 7B:
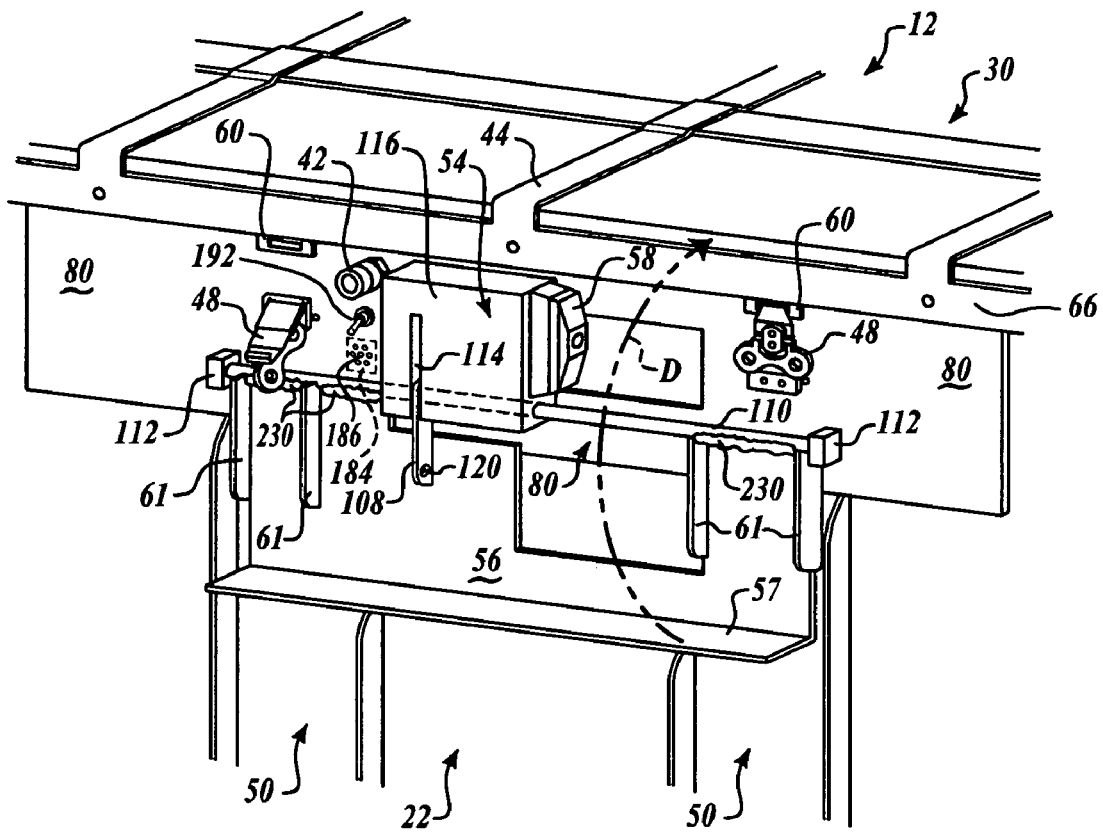
FIG. 7B is an isometric view of the lid locking assembly showing the flanged lock cover in the lowered, unlocked position.

FIGS. 7A and 7B are partial front views of the flanged lock cover 56 in the raised and lowered position, respectively. The top lid locking assembly 54 is welded to the front exoskeleton panel 80. Flanged lock cover 56 is welded to lock cover mounting rod 110, which rests in rod brackets 112, each of which brackets in turn is welded to front exoskeleton panel 80. Lock cover 56 is raised in FIG. 7A so that flange 57 (best seen in FIG. 8A) extends over lid lip 66 and lid 30 preventing access to electronic locking assembly 54 which can be clearly seen in FIG. 7B, which shows the lock exposed.

FIG. 7B is an isometric view of the lid locking assembly 54 showing the flanged lock cover 56 in the lowered, unlocked position, exposing lock housing 116. Arrow D shows the closing and opening path of flanged lock cover 56. Now visible are rotary cam-type lid latches 48 and the respective lid tangs 60, which, when engaged and rotated, cinch down lid 30, sealing lid seal 46 to lid lip 66 (see FIG. 2). Vertical flanges 61 form reinforcing channels in the lock cover 56, and secure both sides of each lid latch 48 against tampering.

Latch plate 108, which is welded to the lock cover mounting rod 110 and the lock cover 56 is now in the down position. However, when it is raised, its hole 120 engages the locking pin or plunger 122 of lock body 126 (best seen in FIG. 8B).

Figure 7C:
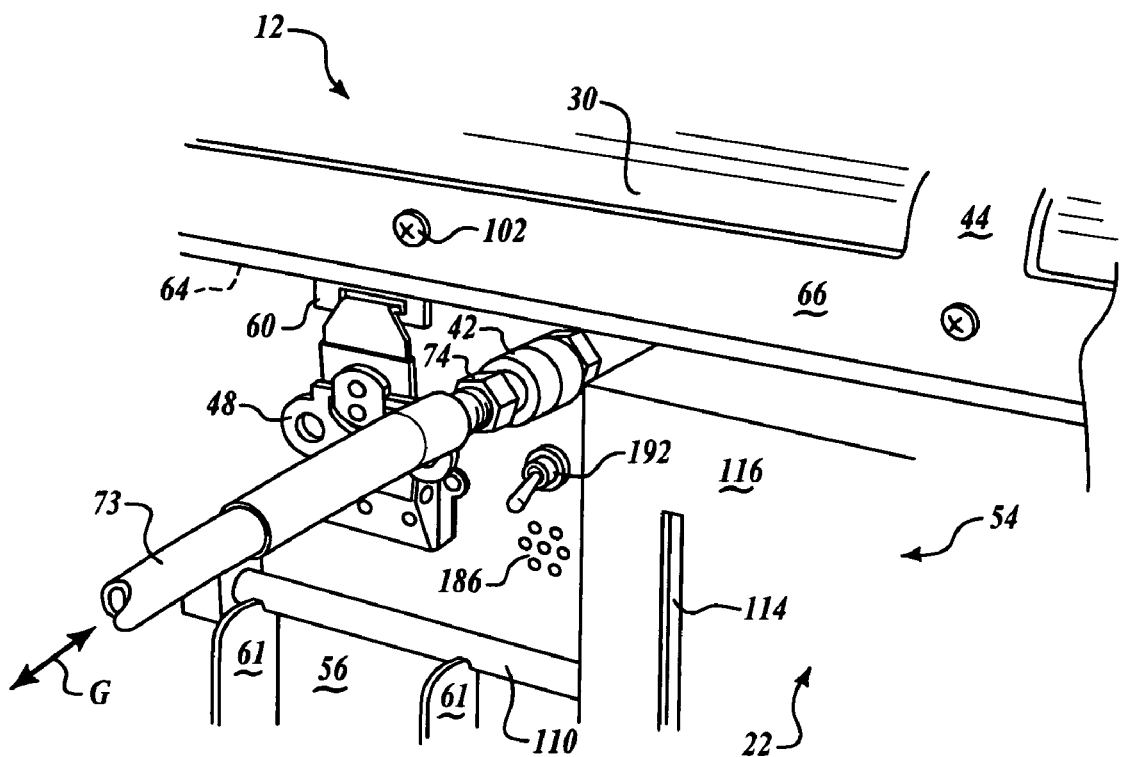
FIG. 7C is an isometric view of the front of the inventive mini-pallet box showing a security gases inlet, gases purge, or vacuum exhaust line inserted in the quick-disconnect coupling on the front left of the box as seen in FIG. 7B.

FIG. 7C is an isometric of the left, front side of the mini-pallet box 12, showing the lid 30 closed with the cam latch 48 engaging and pulling down the lid lip 64 from which the lid latch tang 60 extends. Also seen is the lid perimeter strapping 66, one of the top exoskeleton straps 44, the housing cover 116 of the lock assembly 54 with the latch plat slot 114 exposed. The lock cover 56 is in the lowered position, being pivoted down on its mounting rod 110. The alarm speaker grille 186 and alarm switch 192 are shown between the lock housing 116 and the cam lock 48. Above the switch 192 is show a female, quick-disconnect type gases or fluid inlet port 42. Jacked into the inlet port 42 is a gases supply/evacuation hose 73, which terminates in the corresponding male quick-disconnect fitting 74. Gases can be inlet or withdrawn via the hose and couplings 42, 74 as indicated by the bi-directional arrow G.

Figure 8A:
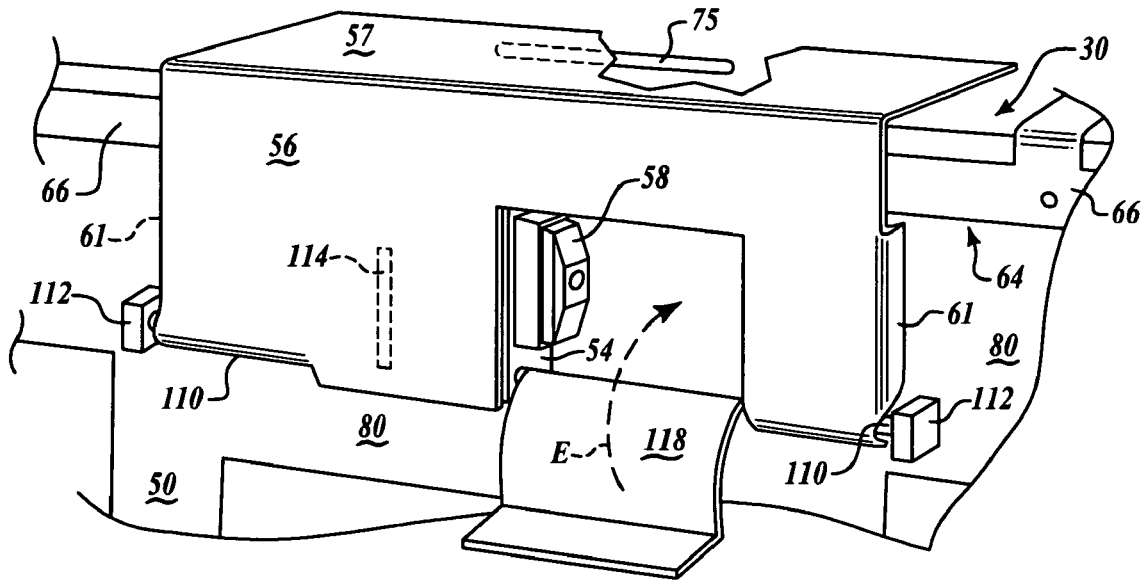
FIG. 8A is an isometric view of the lid locking assembly showing the optional flexible weather cover in the lowered, open position.

FIG. 8A is an isometric view of the lid locking assembly 54, 56, 57 showing the flexible weather cover 118 in the lowered, open position. Note angle flange 57 in the locked position extends over the edge of lid 30. At each end of the lock cover 56 is a flange 61 that extends to just contact the front exoskeleton panel plate 80 to prevent access to the cam-type lid latches from each side of the lock cover plate 56. When locked, the only exposed portion of the lock assembly 54 is the lock key plate 58, where the key 134 is placed (see FIGS. 11A and 11B). To protect the lock aperture from weather, weather cover 118, made of flexible rubber or plastic polymer pivots into place when access to lock plate 58 is not needed. Weather cover 118 moves along pivot arrow E.

FIG. 8A also illustrates a portion of an extended top flange 57 that is broken away to reveal ballot slot 75 for the embodiment in which the inventive mini-pallet box is configured as a ballot box. In that embodiment, the view of FIG. 8A is either from the front or the back, preferably the back of the box, in which case the lock assembly 54 is a second lock assembly. In this embodiment, the election officials maintain the uniquely programmed key for the front of the box, as seen in FIG. 2, while polling place officials or others, such as international election monitors or facilitators, maintain the separate, but differently programmed key for the rear, ballot slot lock 54 of FIG. 8A. The polling place official opens the rear lock shown, rotates the lock cover plate to the down/open position (see FIG. 7C) and the slot is revealed to receive ballots into the still-secure, locked box. When the voting period time ends, the cover is closed and the rear lock shown in this figure is relocked. This rear lock, as with the front lock includes memory in both the key and the lock body that keeps an audit trail of the opening and closing time. Also, the GPS unit placed in the box by the election officials, or mounted in a hollow leg of the box, tracks the location, either by polling, by periodic data burst reporting, or both.

Figure 8B:
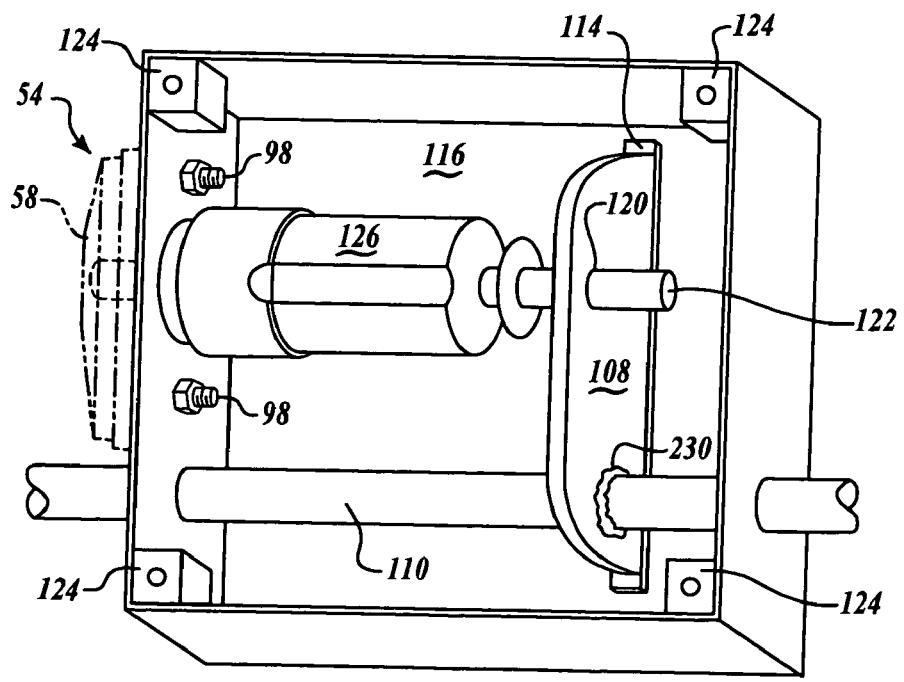
FIG. 8B is an isometric view from the interior of the lid lock in its housing engaging the latch plate in the locked position.

FIG. 8B is an isometric view from the interior of the lid lock assembly 54 in its housing 116 engaging the latch plate 108 in the locked and upright position. In this view, lock rear access panel 92 has been removed (see FIG. 6B), revealing cover plate mounting blocks 124, and exposing lock body 126. As flanged lock cover 56 is moved into the upright position (see FIG. 7B), latch plate 108 which is welded at 230 to mounting rod 110 (and also to lock cover 56, see FIG. 7B) has been moved through slot 114 into the locked position so that lock plunger 122 is extended through latch pin hole 120, locking flange 57 over the top of the lid 30, see FIGS. 7A, 7B and 8A.

FIG. 9 is an isometric of the body interior reinforcing plates 104 bolted through the box walls (rear wall 28 is shown) to secure front and back end wall exoskeleton panels (rear panel 82 is shown). Also visible is an interior reinforcing bar 68 along the inside top edge of rear wall 28, and bolts 98 securing bottom exoskeleton panel 84 to box bottom 32. The inside opening of the gas port 42 is shown on the upper left, but it can be at any location on the rear panel 82, preferably near the bottom right of the figure shown to assist in good gas flow through the container volume. An auxiliary audio alarm is shown at 184 in the rear wall.

The electronics bay 170 for the inventive smart mini-pallet box cargo container is shown in the left rear inside corner of the box 12 (the cover panel is not shown). From bottom to top is trickle charger 172, battery 174, and a combined RF transceiver/microprocessor unit 176, and GPS unit 178, the latter being located in a recess in the top lip of the box, which is covered by panel 180. This locates the GPS out of the way of shielding exoskeleton metal. Shown in dashed lines behind the trickle charger is a female outlet for the charger plug into external power supply. The male plug 20 for external power is best seen on the upper right in FIG. 2. The male plug 20 is wired to the female plug in the bay 70. The battery is trickle charged during ware-housing, during transit or at its destination by plugging external 110 v power into the male outlet 20. The battery powers the remainder of the electronics. Although not shown in this figure, the battery/trickle charger system can also power the audio alarm 184 (see FIG. 7B) and sensors 196 as needed. An optional, but preferred, red LED 182, seen from the outside in FIG. 1 and from the inside in FIG. 9, is also wired to the microprocessor and it lights when the system is armed. In addition, the molex connector on the bottom of the RF/microprocessor unit 176 includes a lead and connector 194 (see FIG. 9) to the side wall security screen array 128, best seen in FIG. 10A. Thus, when the screens are cut, the RF/GPS unit can signal out the event, time, and location.

It should also be understood that a wide variety of sensors 196 can be placed on the interior or exterior of the box top, bottom and side walls, or distributed inside the box cargo volume 62 and hard wire-connected through a molex connector on the RF/GPS unit 176. Optionally, and preferably, the sensors 196 communicated their data outputs via short range RF to the unit 176 to signal their state, status or an anomalous condition. These sensors 196 may be powered by the battery 174. Preferably, sensors 196 include their own battery power (typically small hearing aid, watch or camera-type disc batteries, or kinetic power units) that provide enough power for years of operation. The sensors 196 can detect, among other conditions: intrusion; ionizing radiation and X-ray; sound; light color, contrast and intensity; ultrasound (US); infra-red (IR); electro-magnetic fields; current, voltage and resistance; humidity; pH; temperature, including absolute values, change and rate of change in temperature, including both external ambient and internal; motion, such as change of direction (inertial), acceleration and speed of travel; transient vibration, displacement, inclination and shock; pressure, weight, load and force, including absolute values, change and rate of change in values; and gases, fine particulates, fumes, chemicals and biologicals, by type and amount, such as gaseous CO, $CO_2$, $O_3$, $N_2$, $H_2$, or volatile hydrocarbons, e.g., smoke, propane or gasoline, explosives, Anthrax, Ricin, and Sarin, Chlorine, Bromine, Tabun, Soman, VX, Phosgene and Diphosgene, Chlorpicrin, Hydrogen Cyanide, Arsine, Agent Orange, or other immobilizing, irritating, incapacitating or lethal gases (including single components of binary, ternary or quarternary gas mixtures); and the like.

In addition, the sensors 196 can include snorkel tubes from the outside surface of the container 12 leading into totally encapsulated (sealed) sensors located inside the box or in the microprocessor unit 176. The sensors can be preset to sample parameters every one to 2 seconds up to once every several hours, and transmit updated and normal data in periodicity ranging from every 1-5 minutes or so to once per day, or only as changes or events occur. The periodicity and range of transmission may be adjusted to accommodate particular goods or conditions. Where there is no change, or the changes are within a predetermined acceptable range, the sensor can go into a sleep mode until the next programmed reading and transmission. In addition, the sensors can be polled and respond back with a reading upon request from the relay or RF/GPS or GSM unit to which they report.

As described, the sensors 196 can be distributed in or on the box, or can be mounted on the PC board of the microprocessor in control unit 176. The sensors sense conditions a predetermined value above or below a baseline value, compare and conclude that the sensed signal is an anomaly, relay that to the microprocessor in the controller 176 which in turn further analyzes the information and packages it with other data from other sensors and the GPS system and radios it out. The RF transceiver is a transmitter and receiver that relays the information to a designated site, such as a home base or service company server, typically via a paging network (950 MHz, or other FCC designated frequency). Where the truck has a master GPS system (GSM), the RF transceiver in the box can radio to it, which packages the sensor data with its GPS then-location data of the vehicle, and relays that to the server.

The RF/GPS or GSM units can also be programmed to alert the driver. As a working example, consider a moving van or reefer truck in which the inventive smart mini-pallet containers or the truck cargo hold includes external ambient temperature sensors. In the case where the smart containers are loaded with heat labile organic or biological materials, such as wines, rare books, paintings, photographs, vaccines, laboratory specimens, fresh produce or the like, when an un-permitted temperature or rise in temperature is detected in the cargo hold, the containers can be polled via the transceiver to report back the temperatures inside the individual smart boxes in the hold. Where the temperature is high or the rise exceeds a predetermined rate, the driver or other attendant can be paged so he/she can check to determine if the back door of the truck has been left open or has come ajar, or can check the on-board refrigerator compressor to determine if it has failed. Likewise, the driver can be paged if one or more containers detects an anomalous condition at any time.

Short range RF (wireless) sensors of the type useful in the inventive smart container system, having frequencies in the range of from 308 to 916 MHz and a battery life of 3-5 years, are available from Radio Data Corp of Scottsdale, Ariz. They communicate via a sensing transponder (or the transponder has its own on-board sensors) as well as being able to receive transmissions from a Radio Data Corp Universal Sensing Transmitter (USST) and other external wired sensors or status indicators. It also has a micro-controller, a 916.5 MHz transceiver, a flash memory and a real time clock (for data storage) and either an RS232/485 interface or a USB interface. This can either connect directly to a GSM, GPS/GSM or GPRS unit or it can communicate (using the 916.5 Mz transceiver to a reader that can have an 802.11, 802.15, 802.16, GSM or other global communication link. The transceiver can also be used to send local alarm signals to a Radio Data Corp Key Fob Alarm that can be worn by the driver or attendant, thereby paging them. The transponder is a collector of multiple sensor transmitter signals and the reader is a concentrator of multiple transponder signals. Radio Data Corp also provides a Key Pad Poller which allows manually coded transmissions (or instructions) to be entered into the system via either the transponder or the reader (like a parking space or loading dock number) or it can be used as a load or door status indicator.

An example of an RF/GPS unit of a type useful with the controller 176 in the inventive smart cargo containers is a PADTAG unit available from PAD, Inc. of Longvalley, N.J., in which case the RF transmission is sent to and received by a paging or reflex network (950 MHz), and routed to a base station server. Each shipper, customer or other authorized tracker can access data on individual ones of the smart cargo containers or groups of them via a customer or user name and password on an SSL server webpage. The tracker can poll where the container is, and the location provided by the container's GPS/GSM unit will be displayed on a map. In addition, in the case of an anomalous condition being sensed, such as: unauthorized unlocking; attempt at tampering, entry or opening of the container; unlocking at an improper location; sensing temperature, humidity, chemical conditions, and the like, the system will wake up and emit an alarm, including audio, visual, sending of e-mails, faxes and phone calls, to a selected number and type of individual for response. The Radio Data Corp wireless sensors can be mounted on a Radio Data LITMIS daughter board mounted on the PADTAG controller board. An example of a commercially available GPS unit is an Earthmate GPS LT-20 unit, available from Delorme (delorme.com), or similar units from Garmin, Magellan, Lowrance and Philips.

It is preferred to include an audio alarm system in the smart container. As best seen in FIGS. 7B and 9, a battery-powered 90 DB audio alarm unit 184 is disposed in the front wall 22 and/or the back wall 28 of the container just behind speaker grille 186. This alarm is activated by simple magnetic or button type contact switch elements 188, 190, in the lid and top of the box wall or interposed between the inside face of the lock cover plate 56 and the lock housing 116, respectively, as best seen in FIGS. 2 and 9. A switch 192, see FIG. 7B, arms or turns the alarm off. If the lid is opened or the lock cover plate is removed or lowered, the alarm sounds. A delay of a few seconds can be provided in a conventional manner. In use, after unlocking the cover plate 56, the switch 192 is accessible, and is moved to the off position. Then the top 30 can be unlatched via cam latches 48 and opened. The circuitry is straight-forward for the audio alarm, its battery, the NC magnetic switch, and the toggle switch, based on the principle that when the circuit is broken the alarm will sound.

It should be understood that the red LED 182, or a duplicate of it, can be part of the audio alarm circuit. Where two red LED's are used, when both are illuminated, it means both the RF/GPS system and the audio alarm system is armed. Instead of two red LED's different colors may be used, e.g., red for the RF/GPS system and blue, white or yellow for the audio alarm. In other embodiments, the inventive smart mini-pallet cargo container may include a number of externally visible status or condition LEDs, the function of which is signal status including at least one of an armed condition, an open condition, a battery low condition, an attention-required condition, a wrong location warning, and a breach or damage condition. In the ballot box embodiment, the plate location can activate through a reed switch, a status LED to show that the slot is open, green LED, or closed, red LED.

Figure 10A:
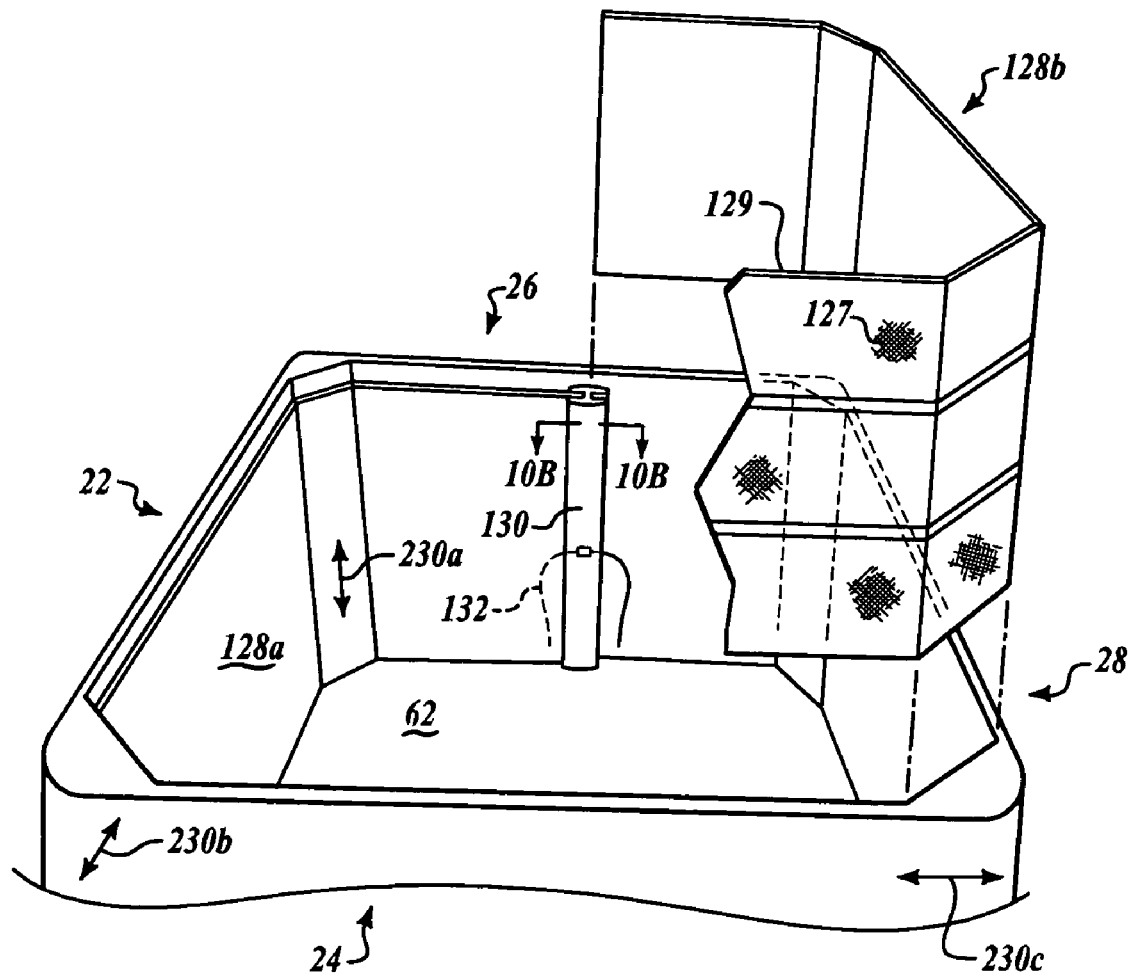
FIG. 10A is an isometric, partly exploded view of the interior of the smart cargo container showing insertion and placement of the optional side walls security screen(s)

FIG. 10A is an isometric, partly exploded view of the interior of the smart mini-pallet cargo container 12 showing insertion and placement of optional but presently preferred side and end wall security screens 128a and 128b. A suitable security screen of fiberglass mesh interwoven with spaced, 30-gauge Tefzel-coated wire strands is available from National Security Screen, of Woodbridge, Va. The security screen 127 is secured to the outside of thin, but tough, rigid plastic paneling 129, such as styrene or ABS. The screen halves are suitably sized and shaped to conform to the inside dimensions of load volume of box 62. Two halves, 128a and b are placed into the box and connected at one end with wire connector 132, so that any breach to the surface of the screen triggers the electronic security system which alarms, tracks and audits each specific container. FIG. 10A also shows schematically, three orthogonally oriented kinetic power devices, 230a, 230b and 230c disposed in the side and or end walls of the container to provide power, or recharge power to the electronics or sensors.

Figure 10B:
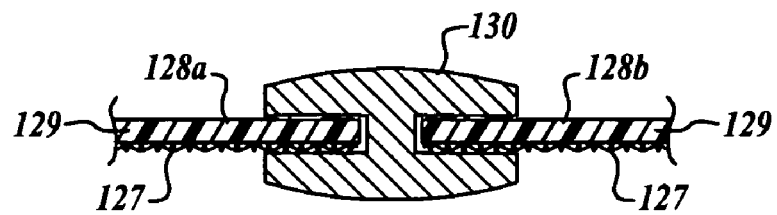
FIG. 10B is a section view along lines 10B-10B of FIG. 10A of the optional H-connector that retains the interior security screen panel(s)

FIG. 10B is a section view along lines 10B-10B of FIG. 10A of the H-connector 130 that retains the interior security screen panels 128 a and b. As an alternative to the hard-wired screen intrusion or wall-breach sensor, any suitable RF sensor can be used, such as one or more light or sound detecting sensor(s) capable of detecting cracks, drilling through the walls, cutting with saws, or the like. The RF sensor communicates to the controller which in turn reports the event.

Figure 11A:
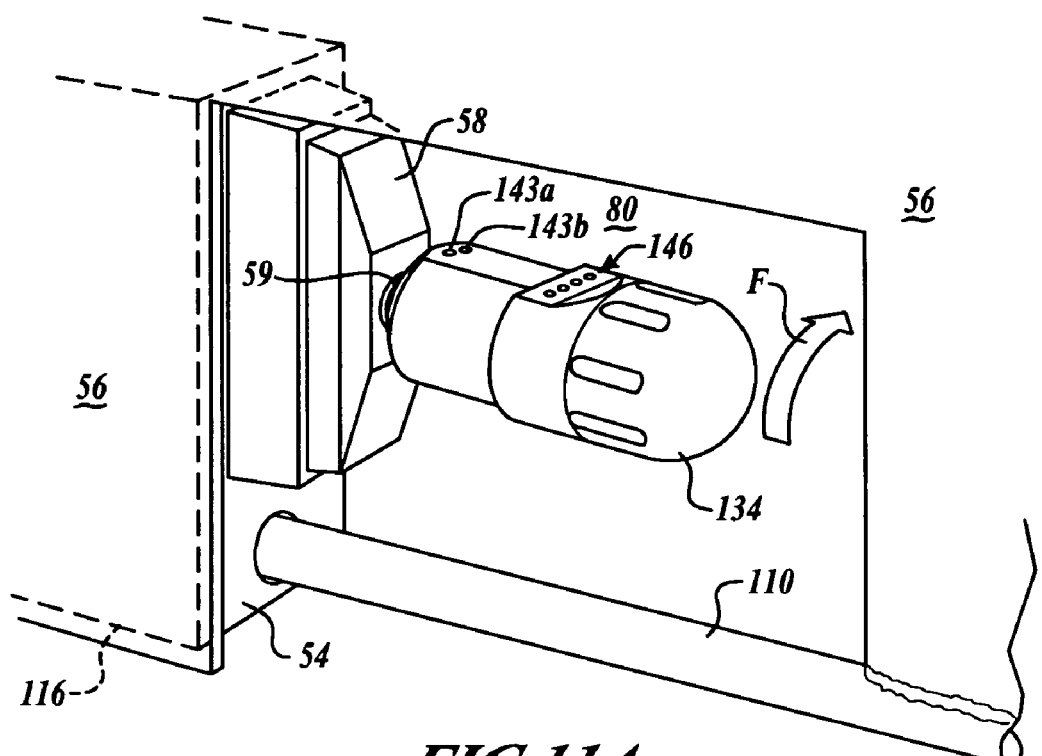
FIG. 11A is an isometric of the electronic key inserted in the lock aperture (keyway)
Figure 11B:
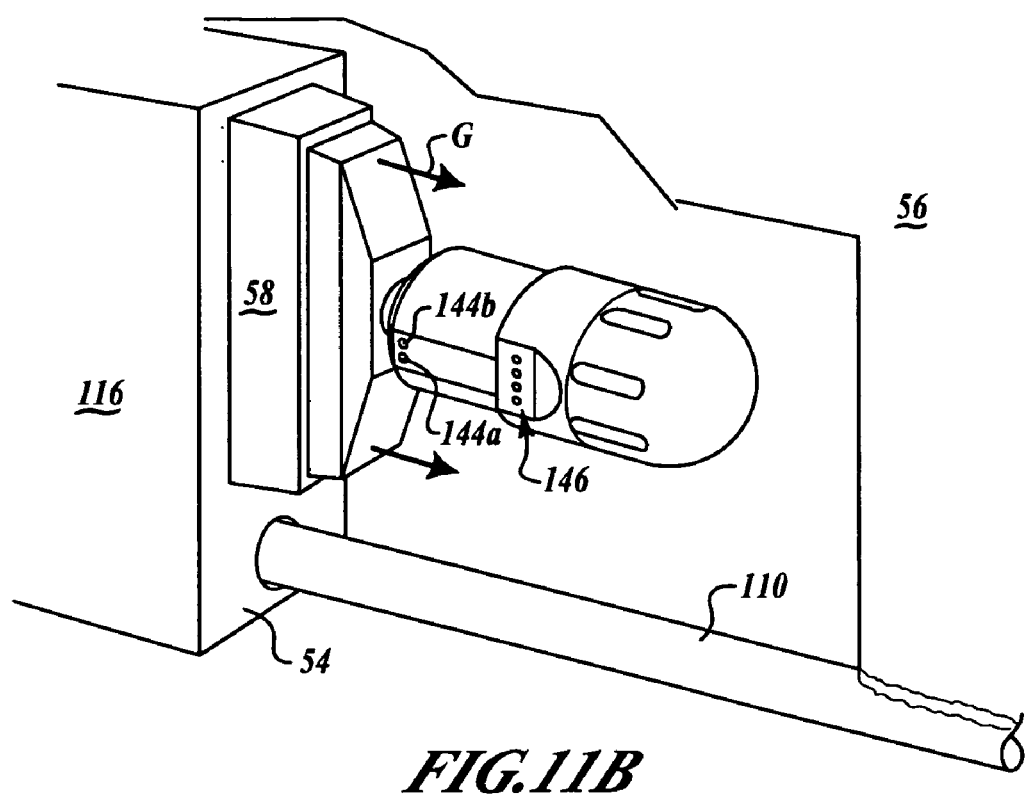
FIG. 11B is an isometric of the electronic key inserted in the lock assembly, and rotated into the "open" position to release the lock plunger.
Figure 11C:
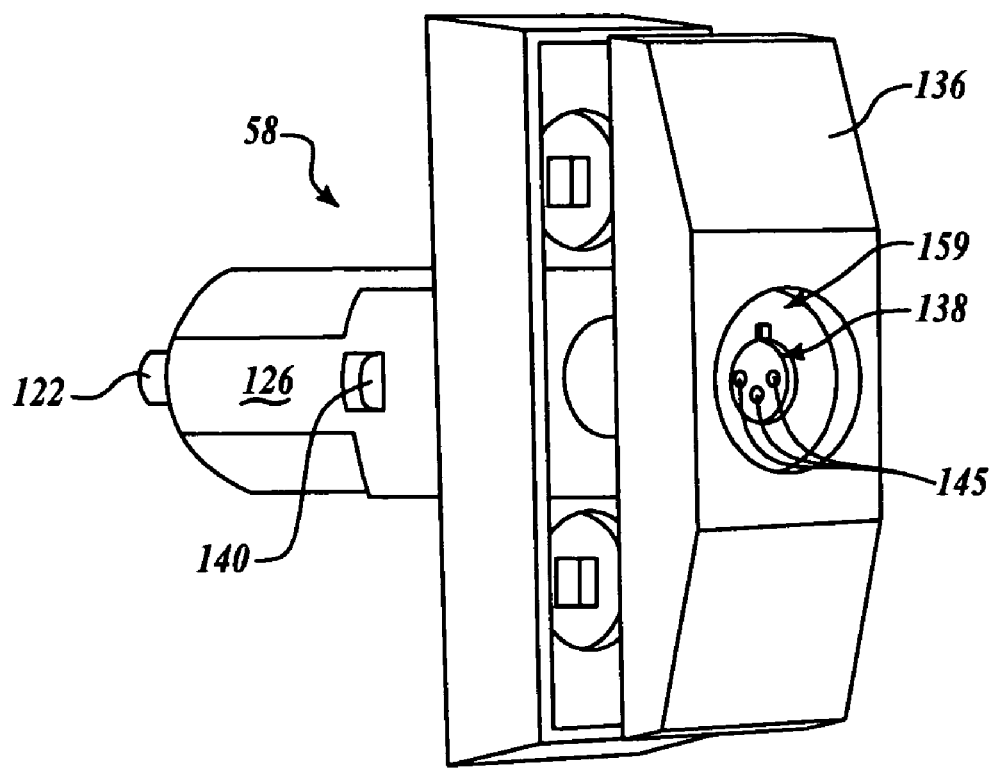
FIG. 11C is an isometric of the lock popped open upon turning the key as in FIG. 11B.
Figure 11D:
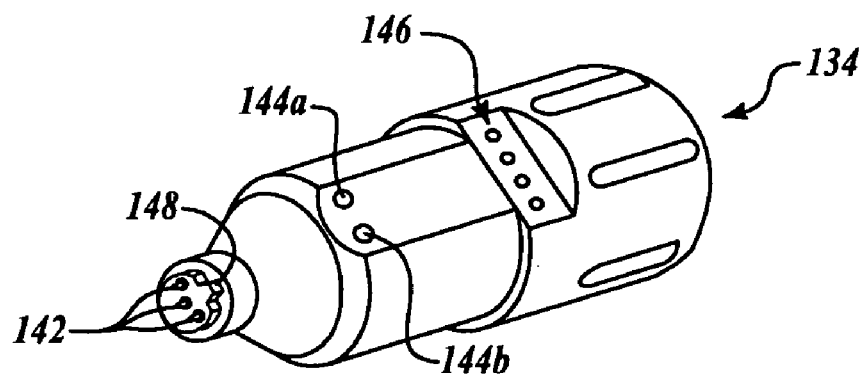
FIG. 11D is an isometric of the programmable electronic key showing the electrical contacts that engage the lock.

FIG. 11A is an isometric of the knob or handle-shaped electronic key 134 inserted in the lock plate 59 (keyway). FIG. 11B is an isometric of the electronic key inserted in the T-handle type cylinder lock assembly, and rotated clockwise into the "open" position (see Arrow F in FIG. 11A) to release the lock cylinder 126 and its plunger 122 (see FIG. 8B). FIG. 11C is an isometric of the lock popped open upon turning the key as in FIG. 11B. FIG. 11D is an isometric of the programmable electronic key 134 showing the electrical contacts 142 through which signals pass to lock 58 when the properly programmed key has been placed in the key aperture 138.

Viewing this series of figures, upon insertion of key 134 into aperture 59, the key contacts 142 engage the corresponding contacts 143 of the lock. When the key code and lock code match, a green LED light 143a is illuminated and the key can be turned. If a red LED 143b lights up, the codes do not match and the access is not authorized, nor will the key turn in the lock.

Assuming an authorized key code is matched, the key 134 it is turned along the path of Arrow F (the lock can be oriented so that the key has to turn either clockwise or counterclockwise, when viewed from the right side, to open). When turned, the key 134 releases catch(es) 126, and lock bolt or plunger release the T-handle 136 (best seen in FIG. 11C), is spring-biased to move outward along Arrow G (in FIG. 11B). That allows locking pin (plunger or bolt) 122 to be pulled out of latch plate hole 120 of latch plate 108. The lock is now opened and the lock cover 56 can be rotated down to provide access to the cam latches 48.

Note that only when the lock and key code match (green LED signaling match) can the tang 148 of the key be rotated to release the catches 126. Releasing latch plate 108 permits flanged lock cover 56 to open, which in turn permits lid latches 48 to be released from tangs 60 for access into box interior 62. By way of example, a suitable electronic lock is the "NexGen" electronic high security lock system, available from Medeco Inc. of Salem, Va., USA, a division of Hillenbrandt Industries, Inc. The NexGen electronic lock provides access control, audit capability, route management and the physical security of a high quality mechanical lock. No hardwiring is required of the lock because it derives all of its power from the programmable key, which is battery powered to last for up to 6,000 or more audit events. The software system permits the user to program into the key, authorization who may open the lock and when they may do so. Both the lock and the key may contain event memory, minimally the key and preferably both. Upon download of data from the key or/and the lock, the software program provides detailed reports for complete security management, including all openings and attempted openings. Because the keys are electronically reprogrammable, locks and keys can be immediately rekeyed to replace lost or stolen keys. A single key can access up to 11,000 differently programmed locks, and each lock can store up to 2,000 audit events. While the electronic keys are currently available in four different styles, each is designed to be able to open T-handle cylinder, cam or padlock style locks. In the instant smart mini-pallet box cargo container, the T-handle type cylinder lock is preferably employed with the cylindrical, round end, handle-type key.

As seen in FIG. 11D the programmable electronic key 134 includes spring-biased protruding pin-type electrical contacts 142 which signal lock 58 when the properly programmed key has been inserted in the key aperture 138 (also known as a "plug face") to align with the respective shallow recess contacts 145 in the lock. As described, when electronic "recognition" between lock and key has occurred, the green LED lights-up, and when there is unauthorized attempt, the red LED lights-up. The key includes a flat with a plurality of contacts 146, four being shown, for proper orientation of the key in the programming cradle. This is seen in FIG. 11E, which illustrates programming (pre- and re-programming) key 134 via the contacts 146 on the opposite side of the key, as seen in FIGS. 11B and 11D.

Figure 11E:
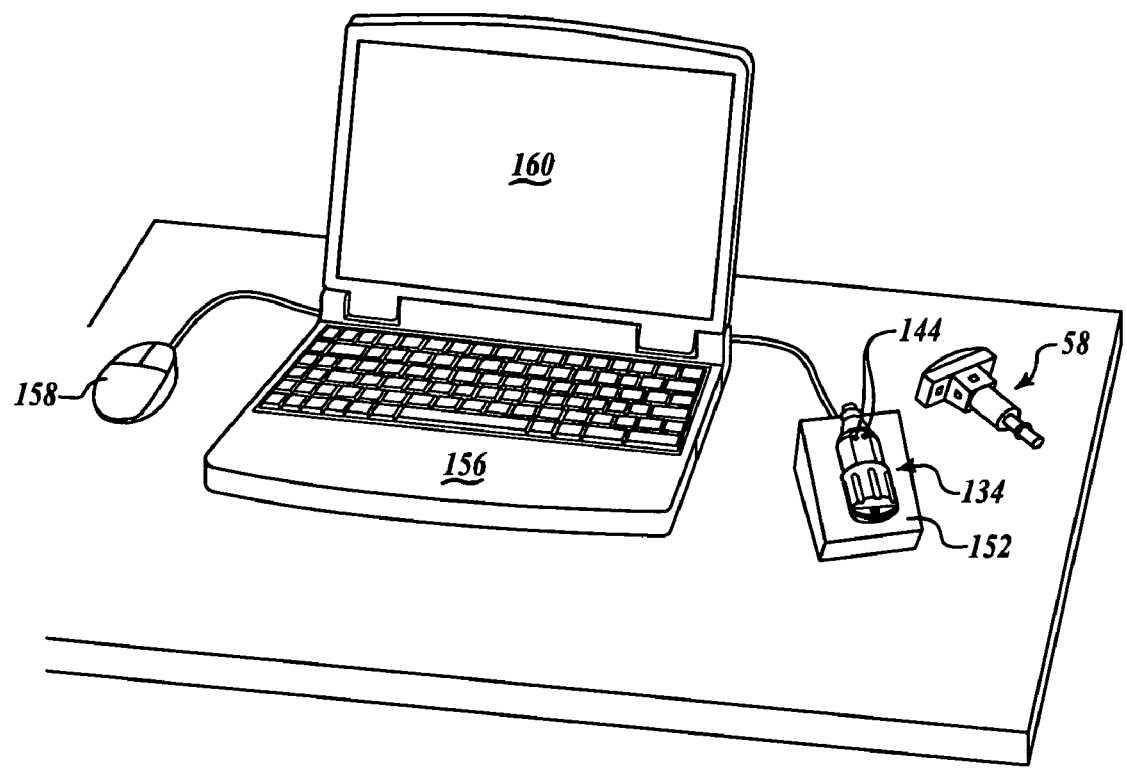
FIG. 11E is an isometric of the hardware for configuring use authorizations and audit trail downloads of the electronic key with the inventive smart mini-pallet cargo container.

FIG. 11E is an isometric of the hardware for configuring use authorizations and audit trail downloads of the electronic key of the inventive smart cargo container. Key 134 is resting in cradle 152, its underside flat aligning it to the cradle's pins 154. Programming contacts 146, seen in FIGS. 11B and 11D, are not visible in this view, as they are on the underside of the key 134, aligned with programming contacts located in cradle 152. Programming is performed using a laptop or desktop computer 156, shown here with standard mouse 158 and monitor display 160. LED lights 144 (seen also in FIG. 11B), one red and one green, light when the programming is in process (red) and complete (green). Alternatively, the programming can be done by use of a hand held PDA or tablet computer. In addition, the red/green LEDs 144 can be amber/green or any other color combination, and can indicate the key is downloading the accumulated data from its memory and download complete, or the like suitable code.

The electronic locks have a hardened steel shell (the body 126, bolt or plunger 122, release T-handle or head 136 and plug face 138 as shown in FIG. 11C), and the keys electronically record in included memory (for example, flash memory) on the order of thousands of separate auditable events, including at least one of: opening attempts; failure to open; positive open events; time of event; and the duration that the lock is in the open state. In addition, the keys can be programmed at home base (see FIG. 11E), or in the field by laptop, PDA, cell phone (including Blackberry or Sidekick) and the like devices, and the programming configuration code can be provided from a remote center to the programming cradle driving device (laptop, PDA, cell phone, etc.). The keys can be programmed to open locks only within specified time parameters. Each key is uniquely identified, both electronically and by bar code strip on the side or face of the key, so that they can be issued on a restricted basis to only authorized personnel, and they can be accounted for. When the key is inserted in the lock, the lock memory can download to the key, so that upon putting the key in the programming cradle the lock history data can be downloaded to the computer system for analysis and reports.

The electronic keys useful in the inventive smart mini-pallet box, need not have physical contacts as in the above described, non-limiting example, but may be activated via a RFID system to provide the key/lock recognition/authorization functionality permitting the key to be rotated in, or otherwise open, the lock. In addition, the lock may contain within its body 126 or within the housing 116 a flash memory drive to record a wide variety of events related to the lock, such as the ones enumerated for the key, or the condition status of the box.

In another important alternative embodiment, a GPS unit is incorporated in, or electrically connected to the lock or the key to provide a second level of access control, in that the lock is programmed so that if it is attempted to be opened at other than a pre-determined, pre-programmed destination, the lock will not open. Thus, upon the key being inserted in the lock, the then-GPS coordinates are checked and compared to the programmed location in the memory of the key or lock, and if they compare, the green LED lights or flashes and the lock can be opened. As in the above example, if the coordinates do not compare within a pre-selected margin of error, e.g., within the accuracy of the GPS unit (within a few feet), the lock will not open. In either event, the history record will be stored for future download, or real time reporting by RF, e.g., Pager, Cell Phone, Bluetooth or other wireless network. Thus, the unauthorized event can be reported in real time to on site, near-by local, regional or distant location, by direct RF, or via RF to a local WAN or LAN wireless (e.g., 802.11-type) router that communicates via the Internet to a server at the shipper's, customer's, or security service (including governmental, military or law enforcement) headquarters or service center for appropriate action.

Figure 12A:
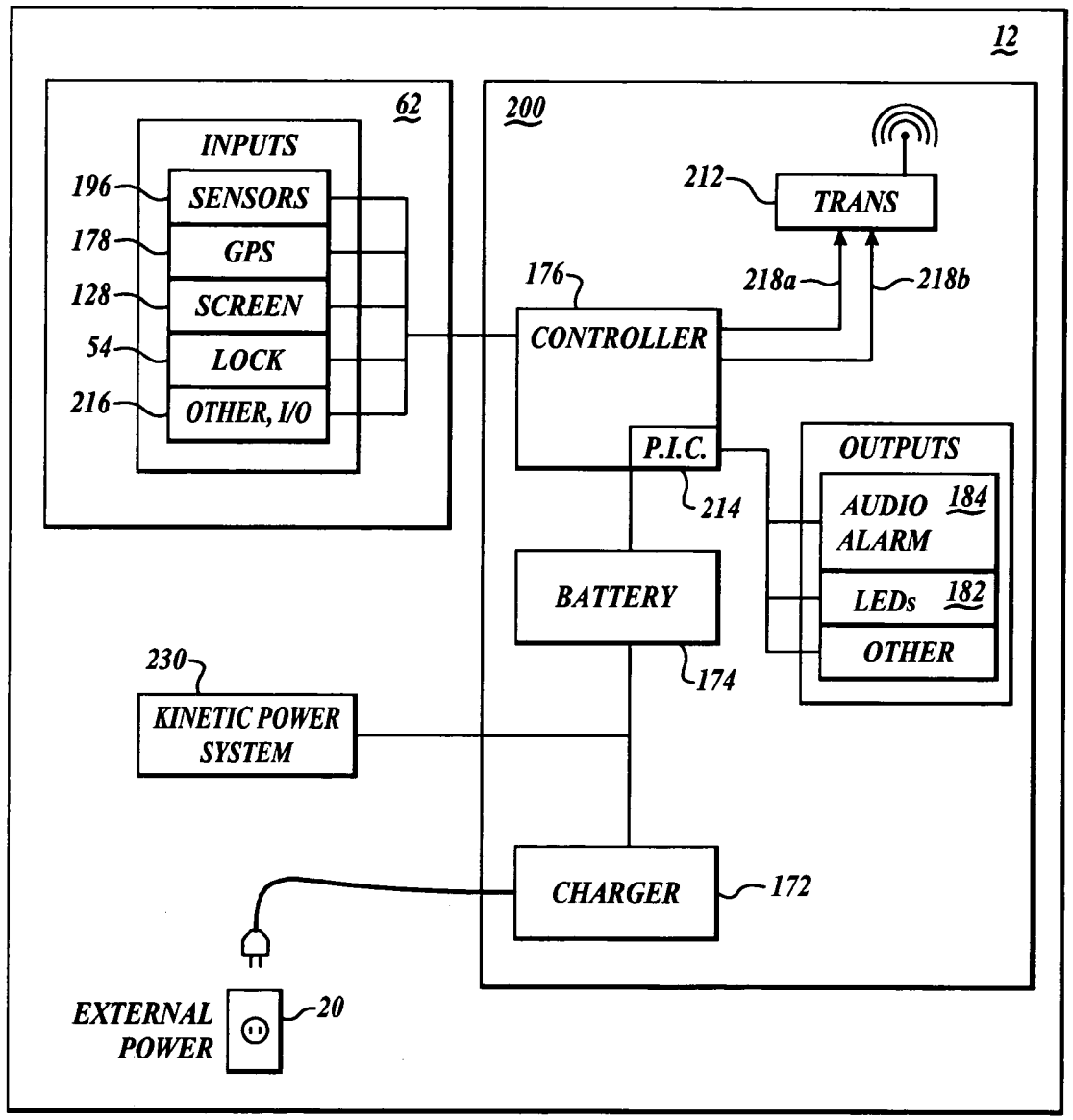
FIG. 12A is a schematic block diagram of the architecture of the controller and data communications system as employed in the inventive smart cargo container.
Figure 12B:
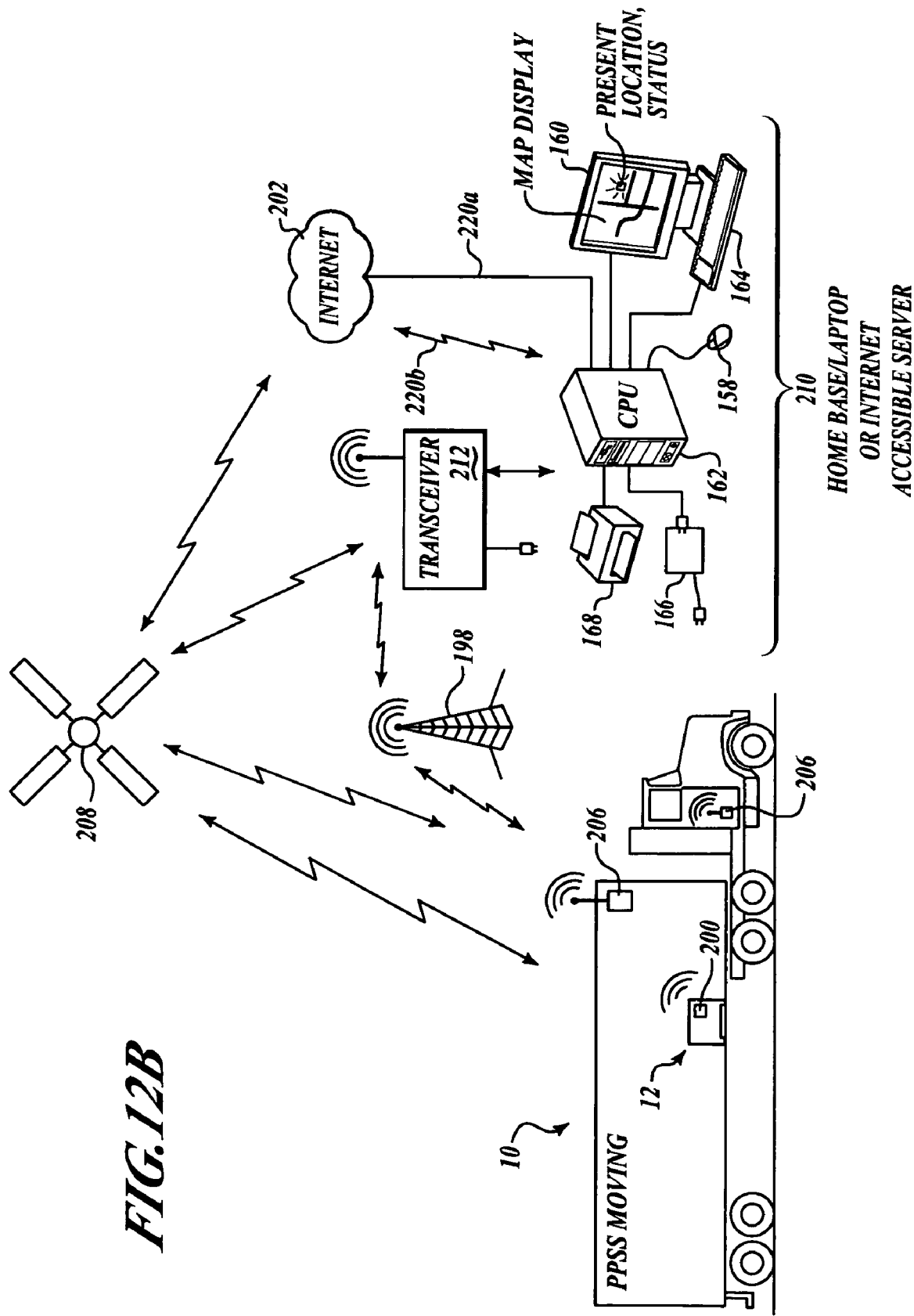
FIG. 12B is a schematic of the system and operational architecture of the remote electronic tracking and security reporting by the inventive smart container.

FIG. 12A is a schematic block diagram of the architecture of the controller and data communications system as employed in the inventive smart cargo containers, and FIG. 12B is a schematic of the system and operational architecture of the remote electronic tracking and security condition reporting by the inventive smart containers. The smart container data communication and management system includes sensors, locks, alarms, container armed status lights, data encoders, transmitters and/or transceivers, computer programs, data bases, and related equipment to enable activation, coding, decoding and use of the data communications system, including real time and past history display of status and location, and management and operation report generation. The inventive smart cargo container monitoring and management electronic data communications system includes container-mounted components 200, separate remote signal relays (towers 198, satellite 208), monitoring station components 210, and auxiliary equipment including locators (GPS locators) 178 and locking systems 54. The home base monitoring station 210 includes a computer system having a CPU 162 in which is loaded data engine, display programs and web server or web browser programs to enable activation, operation and use by customers of the data system.

As seen in FIG. 12A, the container 12 includes a communication module 200 which comprises a programmable Peripheral Interface Controller (PIC) 214 mounted on microprocessor controller board 176, a battery 174, optional kinetic power system 230, a transmitter or transceiver (transmitter/receiver) 212, trickle charger 172 connected to the external power via outlet 20, and a wide range of inputs (lock 54, security screen 128, GPS 178, sensors 196) as well as I/O ports 216 for configuring the programmable PIC by computer, and outputs including selected frequency command signals for short or limited range RF broadcast 218a (e.g., to a master GSM, transponder, transceiver or repeater, unit in the truck, moving van, warehouse or via a reader as the truck/van passes a way station), or longer/full range RF broadcast 218b (e.g., to pager or cell network towers or satellites) audio alarm 184, status LEDs 182, and others, 216. The container location and status data can be sent as text, and can include a time stamp. The PIC can conserve battery use by turning the radio "ON" just before a transmission will be sent, and can be configured to transmit a ⅓ second position burst after container data input, or to send container status/condition data on command from home base or at cyclic intervals. The PIC operating parameters are stored in its internal EEPROM that is configured from computer system 162 at home base 210, and will persist even when power is removed.

The remote monitoring aspects of the invention provides a method for customers, movers, shippers, election personnel, security/audit personnel, and others concerned and authorized, to monitor from a single "home" base, many containers simultaneously, the number ranging easily in the thousands. Under the inventive system, the tracking personnel can be notified and check when anomalous events occur and can have a complete handling report for each container from empty before loading to empty upon unloading at its destination, and with confidence in the security of the container along the route, including in the transport vehicle (truck, ship, rail, aircraft), in its origination facility, ware-houses or transfer depots along the way and to destination unload or storage.

The inventive security system provides a unique identifier for each container in the field that is radioed to "home base" when the container is first put in use. Each container is preconfigured at home base (e.g., home warehouse, customer or shipper facility, manufacturing facility or the like), or in the field via the PIC program with a unique identification number or other data (name of customer, shipper, type of goods permitted to be shipped, etc), and its cycle of time for status reporting is pre-selected at that time. After loading and closed, it is initialized or enabled, and thereafter the container reports its status, the time, or/and location back to home base on the predetermined timed cycle, e.g., every half-hour, more frequently at night, less during the day, etc.), or to pollers (very short range, long-life battery powered microprocessor-controlled RF transmitters that are placed at various sites around the warehouse, storage facility or customer location), or readers (long range, 100-1500' depending on antenna) transceivers with the ability to receive an interpret the data from the container transponders and then forwarding this information by wired or wireless communication to a computer or computer network for real time location and status data retrieval from the containers). The program at home base displays a map from the map program with each container or group of containers located thereon with a unique icon, and the status can be indicated in text or change of icon, e.g., by animating the icon, changing color, flashing, change of text, combinations of them, and the like. In addition, an audio alert signal can be emitted on the computer speakers when the sensor or lock detects an anomalous event or unauthorized, untimely, or wrong destination attempts to open the container occur.

The inventive computer-enabled smart mini-pallet cargo and ballot box container system permits complete management of the container security during use, transport, storage, loading and delivery, as a business, including communication via the Internet of container status and event reports, orders, billing, e-mail communications, and the like. The inventive system provides a rugged, competent, legally verifiable chain of custody for a wide range of applications, including moving of valuable objects and ballots, In addition, the status reports of each container can be viewed and printed out for analysis, or can be computer-analyzed to show status and anomalous events, including access opening and locking, related by time of day, customer, shipper, by location, and the like. The accumulation of container handling data for a particular site, particular customer, particular shipping line, particular type of goods, and the like, over time can also be analyzed to reveal changes in commerce, types of events, patterns of attempted theft or damage, reduction in theft, and the like.

The inventive communication system includes provision for a wide range of inputs for any given container or type of goods being shipped or stored therein. That is, the PIC can accept a variety of sensor inputs, both interior of the container and external to it, by placement of appropriate sensors that are well known in the art and commercially available. For example, IR and US sensors, microphones, bolometers, thermometers, humidity, pressure, and surveillance optics (some as small as coin sized) are readily available. Following the principles taught herein, one skilled in the art will easily be able to mount any selected sensor(s) and hook them to the PIC for transmission of the sensed data back to home base for display or storage in the computer database. In the embodiment(s) in which a transceiver 212 is mounted in the container, the home base can selectively poll individual sensors for readings, or the PIC can be programmed to provide selected readings on a timed cycle. For example, upon receipt of a signal from the security screen 128 that it has been breached, or from the magnetic sensors 188, 190 that there has been an attempt to jimmy the top of the container, the PIC can be programmed or a signal can be sent from home base to turn on a microphone and/or camera to ascertain more data about the event, or to collect law enforcement or prosecution evidence.

Typically, the RF transmitter 212, or the moving van or truck-mounted master GSM unit, transponder, transceiver, or reader 206 in the cab or in the trailer of the truck or van 10 (see FIG. 12B), sends a data burst lasting less than a second and is only powered when sending; that is, the transceiver 212 is OFF until the programmed PIC 214 sends a wake-up signal (power enable signal) to the transmitter for the transmit burst. The PIC is preferably configured to send an event occurred signal immediately upon the event, rather than wait for the next cycle. The PICs of different containers in a given cluster, e.g., warehouse or truckload, are preferably configured with different cycle send-times so that no two containers send simultaneously to home base.

By way of example only, since the bursts typically last less than a second the theoretical number on a single frequency is 3600 repeated hourly, but typical is every 30 minutes for 1800 container capacity. It is also possible to set the container comm module 200 to repeat the burst in time-spaced intervals, say once each 5 seconds for 3-6 tries, so 1 minute spacings between different container reports is more typical. As an alternative to the pager network frequency of 950 MHz or cell phone frequencies (any one of the quad mode frequencies available world-wide), a useful RF frequency is one of the no-license required frequencies of 154.600 MHz±5 kHz (Green Dot), and 154.570 MHz±5 kHz (Blue Dot). However, dedicated licensed frequencies can be obtained for use through an FCC-licensed Frequency Coordinator. Thus, different containers of different customers or shippers can communicate by different frequencies, so the real-time monitoring of thousands of containers simultaneously is entirely feasible under the inventive system.

As shown in FIG. 12B, the transceiver/transmitter-containing in-container module 200, or the in-moving van or in-truck transmitter/repeater/reader 206 can transmit to tower 198 or satellite 208. In addition, they can receive as well from either of them, including the GPS coordinate system via satellite 208. The transceiver 212 of home base 210 receives the signals, processes them as described above and displays the text data or map data on monitor 160, or prints a report on the printer 168. The system is interactive via peripheral input devices, such as mouse 158 and keyboard 164. In addition, the CPU or server 162 (in the case where home base is a tracking service center server) can communicate via hard wire (DSL, fiber, cable, etc) 220a or wirelessly 220b to the Internet, to access by browser or serve pages that are accessible by the service center customers, e.g., shippers, customers and security service and tracking personnel. That is, the home base of a customer does not need to have a transceiver for direct receipt of the reports. Rather, the customer can access a service center site, enter a customer number and password, and then be served and have access to pages on which that customer's container status and history reports and present location maps are displayed. In addition, the service center can automatically enable event alerts by e-mail, fax, or telephone to the customer. The service center can also alert the driver or vehicle/warehouse attendant(s) to check as events occur and warrant. The receiver in the container can be interrogated (polled) from home base requesting reports of available data.

As shown in FIG. 12B the van or truck 10 may also be the moving customer's home or office of origination or destination, a warehouse or freight forwarding transit location, a polling place or election HQ, or the like. That is, the polling and tracking are location independent.

The computer system 162 is powered by AC or in the case of a laptop or PDA, by a suitable battery. The computer system at home base (or a portable, such as a laptop or PDA) is loaded with suitable operating system, applications programs, Internet browser(s), image transfer and e-mail programs. By way of example, a packet engine program and an APRS program with map data are employed to decode the RF transmission from the containers in the field, and to display the location, identification and status (at identified time/date stamps) of each container, as well as set the parameters for reporting the container status on a timed cycle. A suitable software-only packet engine is the AGWPE program available as shareware (for a contribution license fee) from www.raag.org/sv2agw/pepro.htm, which permits receipt of the data from the receiver 212 directly into the sound card of the computer. Alternatively, a packet modem can be used to convert the receiver 212 signal to digital data for input to the serial port of the computer system 162. The AGW Sound Card portion of the AGWPE program permits tuning the audio signal, permitting setting of the volume and squelch of the input signal from receiver 212, in cases where audio alerts of anomalous events is desired.

A suitable display driver for the map display feature of the inventive system is an APRS application program, available from www.winaprs.org. These programs are available in Windows, Mac and Linux operating systems, as WinAPRS, MacAPRS and XAPRS, respectively. These two programs function as the interface that takes the data from the sound card or the packet modem into the packet engine and the APRS places the trap location/status data on the map program.

Any suitable map data that interfaces with (becomes embedded in) the selected APRS program is used to provide map images. Suitable sources of map data includes: Tiger Maps, which is Census Bureau map data available from www.census.gov/geo/tiger/. Other sources are US Geological Survey, NASA, Delorme maps, Microsoft MapPoint and Microsoft Streets and Trips.

In addition, the computer system can be configured to communicate via the Internet 202 selected data for operation of the container security system as a computer enabled Internet-based business. This includes reports, communications and billings to remote clients or associates, franchisees, regulatory agencies, law enforcement, shippers, customers, and the like. It permits a central home office to communicate with regional offices or remote warehouses or shipping depots. Local, regional or national "views" of shipping and container security activity, such as the real time shipping loading, unloading, access and sensor events, can be communicated automatically to the remote home offices, permitting a nationwide management operation.

Thus, the computer-enable Internet system of this invention includes a base station including a transceiver for receiving RF signals from the smart cargo container RF transceiver, and a computer system including: a web server for securely serving pages to clients and a CPU and memory that includes operating and applications programs that receive, analyze, serve and save, in at least one database structure, time-related and real time security status and location data from a plurality of said containers, including pages having annotated map information of the container identification, map location and movement and event alerts; and at least one client smart cargo container monitoring computer system that includes a CPU, memory, at least one display, and input/output peripherals, said CPU and memory including operating and applications programs that cause the client computer system to access the Internet and receive web pages served by the service bureau base station server upon entry of client authorization data, these web pages including at least the real time and time-related security status and location data about containers for which the client has authorization to monitor, in graphical or text format.

The computer systems of either or both the tracking service server or the customer can include a database of the history of handling of each container tracked and serves that history to the client upon request. This history includes at least one of: a unique identifier for each container; opening attempts, times and durations; personnel authorized to open a container; electronic lock configuring information; handling locations and times comprising shipping and storage events; anomalous events sensed by container sensors; ownership of each container; identification of shipper and customer for each shipping and storage period; nature or type and amount of goods shipped or stored, and the times and periods involved, and the like. That is, any history deemed relevant by the customer can be harvested, stored in a database, retrieved and displayed.

INDUSTRIAL APPLICABILITY

It is clear that the inventive smart mini-pallet box cargo container provides a commercial and national security-significant system of rugged, secure, armored and blast resistant containers for better security and handling history and real time tracking of sealed containers for transporttation, and especially for highly valuable or sensitive personal, retail, research and medical goods, voting ballots for political or business elections (shareholder voting), long haul trucking, military goods, diplomatic or consular pouches, and the like, and at the same time provides for improved security of the goods being shipped, thereby reducing damage, diversion, intrusion, contamination and theft losses during transport and warehousing. Any one of these advantages alone is both substantial and important to the shipping industry, and of great significance to movers, political entities, manufacturers and shippers of goods in commerce. The smart mini-pallet cargo container, in being rugged and unitary, that is, in not having loose parts that can become lost or non-functional, provides additional advantages for commerce. Further it permits the possibility of direct loading into, and unloading from the box, without the need for intermediate packing in cardboard cartons.

As such, the inventive smart, rugged, wheeled, easily movable, mini-pallet cargo container for moving and warehousing is applicable to all industries involved in transport and warehousing of goods, especially high-added-value or politically vital goods, such as personal property, pharmaceuticals, consumer electronics goods (computers, home electronics, etc.), electronic parts (computer components, chips, memory boards), entertainment products (such as CDs, DVDs and Video Tapes), and goods requiring high security transport (such as antiques, collectibles, ballots, diplomatic materials, pharmaceuticals, mail, biological specimens, proprietary information) and the like.

It should be understood that various modifications within the scope of this invention can be made by one of ordinary skill in the art without departing from the spirit thereof and without undue experimentation. For example, the containers may have more or less than 4 walls or have the particular geometric footprint shown. Thus, they could be round. Likewise, the containers can be modified for special lifting modes, such as side or top hooks or recesses for handling by other than forklifts from the bottom. Thus, the feet for forklift access are not an essential limitation of the invention. This invention is therefore to be defined by the scope of the appended claims as broadly as the prior art will permit, and in view of the specification if need be, including a full range of current and future equivalents thereof.

The invention claimed is:

1. A smart mini-pallet box for secure, trackable, pollable and auditable, shipment and warehousing of products and materials comprising in operative combination:
   a) a unitary container body having two pairs of opposed, spaced, generally orthogonally oriented generally planar vertical side walls integral with a bottom, a first pair of said side walls defining a front wall and a back wall and a second pair defining a left and a right side wall, said front wall and said back wall range from equal to, to longer than, said side walls, and at least one pair of opposed walls is short enough to permit said container to fit through residential entry doorways, a generally planar, openable single-piece lid including a margin having a lip for sealingly engaging the tops of said side walls, said lid is hinged to said back wall and includes tangs to engage lid latch members mounted in association with said body front wall and said body walls, bottom and lid defining a cargo load space;
   b) an external structural exoskeleton for both said lid and said body, said lid skeleton comprising criss-crossed straps and a marginal band, and said body external structural exoskeleton is comprised of three panels, a front panel, a rear panel and a bottom panel, said front and rear panels being hinged at a lower marginal edge to the front and back of said bottom panel, said body exoskeleton panels provide a continuous structure for reinforcing said front and back walls against unauthorized entry and transit damage;
   c) an auditable electronic lock system integrated into at least one of a front panel and a back panel of said exoskeleton;
   d) a cover that is closable over the body of said electronic lock and said lid latches to prevent access thereto, said cover including a flange extending over the front lip of said lid and said electronic lock preventing said cover from being opened to reveal said lid latches until said electronic lock is selectively opened by an authorized key at an authorized time, at an authorized place and at combinations of authorized key, time and/or place;
   e) at least one sensor disposed to provide a signal relating to an internal security condition of said cargo container; and
   f) a pollable communications module disposed in at least one of said container walls, bottom or top, said module including a battery power supply, a microprocessor controller, an RF transceiver unit and a GPS locator unit, said controller including inputs for said sensor and said GPS unit, and including a timing circuit for selectively periodically sending data via RF signals representing a unique identifier of said cargo container, and the status and location of said cargo container.

2. Smart mini-pallet box as in claim 1 which includes four casters, at least two of which are pivotable, secured to the bottom of said mini pallet-box.

3. Smart mini-pallet box as in claim 2 wherein said mini pallet-box bottom includes feet spaced at the corners thereof providing recesses therebetween, and said casters are disposed in positions selected from: a) in recesses below said two side walls; and b) securable to bottoms of said feet.

4. Smart mini-pallet box as in claim 1 wherein said power supply is augmented with kinetic power generation devices.

5. Smart mini-pallet box as in claim 2 wherein the exterior dimension of said mini pallet-box between said front and back walls is selected to permit said mini pallet-box to be rolled on said casters through a 30" wide residential doorway.

6. Smart mini-pallet box as in claim 1 which includes at least one of: a) said internal security condition sensor comprises a security screen assembly disposed in the load space to cover at least a position of said walls, said top and said bottom to provide a signal to said controller in the event the screen is breached; and b) a blast mitigation material disposed in association with at least some of said walls, top and bottom.

7. Smart mini-pallet box as in claim 6 wherein said blast mitigation material is selected from a fabric laminate structure, honeycomb or corrugated laminate structure and an encapsulated granular blast attenuation material.

8. Smart mini-pallet box as in claim 6 wherein said blast mitigation material is in the form of an internal liner for said box.

9. Smart mini-pallet box as in claim 1 which includes at least one gas port for introduction of gas into said box, purging gas in said box, or evacuation of gas from said box, and at least one of said ports permits sampling for at least one of pressure in said box, type of gas in said box, and presence of chemicals or bio-toxins present in an inert gas inlet into said box through a first port and sampled through a second port after passing through said box.

10. Smart mini-pallet box as in claim 9 which includes at least two gas ports, dis-posed one on each of opposed side walls, top and bottom, to provide generally effective flow of gas into, from or through said box.

11. Smart mini-pallet box as in claim 1 which includes a slot in at least one of a top and a side wall for secure introduction of ballots into said box, a plate member removably blocking said slot so that said slot is selectively accessed or blocked by said plate member and the position of said plate member is selectably locked in place, to block or permit access to said slot, by said auditable electronic lock system so that only authorized keys can open and close said slot at preselected times and locations and a complete audit trail of ballot box opening, closing or locations can be provided by download from said electronic lock system.

12. Smart mini-pallet box as in claim 11 wherein said mini pallet-box includes an auditable sensor and control system in association with said lock that tracks the time, location and number of ballots inserted in said box through said slot.

13. Smart mini-pallet box as in claim 1 wherein said electronic lock system includes a lock body that opens only upon recognition exchange with a programmable key that communicates with said lock body, and said lock system includes at least one memory element that retrievably stores data on lock access and opening events, including data selected from at least one of time, duration, and unique key identifiers.

14. Smart mini-pallet box as in claim 13 wherein said key is selectively programmable to open only at least one of a plurality of selected containers and to open only at a selected time or location.

15. A smart, blast-resistant cargo container for secure, trackable, pollable and auditable, shipment and warehousing of products and materials comprising in operative combination:
   a) a unitary container body having two pairs of opposed, spaced, generally orthogonally oriented generally planar vertical side walls integral with a bottom, a first pair of said side walls defining a front wall and a back wall and a second pair defining a left and a right side wall, said container footprint ranging from square to rectangular and substantially equal to or less than about the size of a standard pallet, a generally planar, openable lid comprising at least one panel, including a margin having a lip for sealingly engaging the tops of said side walls, said lid is hinged to said back wall and includes tangs in association with a front marginal edge of said lid to engage lid latch members mounted in association with said body front wall, and said body walls, bottom and lid defining a cargo load space;

b) an external structural exoskeleton for both said lid and said body, said lid skeleton comprising criss-crossed straps and a marginal band, and said body external structural exoskeleton is comprised of three panels, a front panel, a rear panel and a bottom panel, said front and rear panels being hinged at a lower marginal edge to the front and back of said bottom panel, said body exoskeleton panels provide a continuous structure for reinforcing said front and back walls against unauthorized entry and transit damage;

c) an auditable electronic lock system integrated into at least one of a front panel and a back panel of said exoskeleton;

d) a cover that is closable over the body of said electronic lock and said lid latches to prevent access thereto, said cover including a flange extending over the front lip of said lid and said electronic lock preventing said cover from being opened to reveal said lid latches until said electronic lock is selectively opened by an authorized key at an authorized time, at an authorized place and at combinations of authorized key, time and/or place;

e) at least one sensor disposed to provide a signal relating to an internal security condition of said cargo container;

f) a pollable communications module disposed in at least one of said container walls, bottom or top, said module including a battery power supply, a microprocessor controller, an RF transceiver unit and a GPS locator unit, said controller including inputs for said sensor and said GPS unit, and including a timing circuit for selectively periodically sending data via RF signals representing a unique identifier of said cargo container, and the status and location of said cargo container; and g) explosive blast mitigation material disposed in association with or integral with at least some of said walls, top and bottom.

16. Smart blast-resistant cargo container as in claim 15 wherein said blast mitigation material is selected from a fabric laminate structure, honeycomb or corrugated laminate structure and an encapsulated granular blast attenuation material.

17. Smart blast-resistant cargo container as in claim 16 wherein said blast mitigation material is in the form of an internal liner for said box.

18. Smart blast-resistant cargo container as in claim 15 wherein said electronic lock system includes a lock body that opens only upon recognition exchange with a programmable key that communicates with said lock body, and said lock system includes at least one memory element that retrievably stores data on lock opening events, including data selected from at least one of time, duration, and unique key identifiers.

19. Smart blast-resistant cargo container as in claim 15 wherein said key is selectively programmable to open only at least one of a plurality of selected containers and to open only at a selected time or location.

20. Smart blast-resistant cargo container as in claim 15 which includes four casters, at least two of which are pivotable, secured to the bottom of said mini pallet-box.

* * * * *